United States Patent
Kawada et al.

(10) Patent No.: US 10,221,339 B2
(45) Date of Patent: *Mar. 5, 2019

(54) ADHESIVE SHEET AND METHOD FOR PRODUCING SAME

(71) Applicant: LINTEC CORPORATION, Itabashi-ku (JP)

(72) Inventors: Satoshi Kawada, Koshigaya (JP); Kiichiro Kato, Saitama (JP); Kazue Uemura, Tsukubamirai (JP); Yumiko Amino, Funabashi (JP); Shigeru Saito, Ina-machi (JP); Koji Tsuchibuchi, Kashiwa (JP); Takamasa Kase, Koshigaya (JP)

(73) Assignee: LINTEC CORPORATION, Itabashi-ku (JP)

( * ) Notice: Subject to any disclaimer, the term of this patent is extended or adjusted under 35 U.S.C. 154(b) by 37 days.

This patent is subject to a terminal disclaimer.

(21) Appl. No.: 15/300,141

(22) PCT Filed: Apr. 2, 2015

(86) PCT No.: PCT/JP2015/060423
§ 371 (c)(1),
(2) Date: Sep. 28, 2016

(87) PCT Pub. No.: WO2015/152357
PCT Pub. Date: Oct. 8, 2015

(65) Prior Publication Data
US 2017/0210949 A1    Jul. 27, 2017

(30) Foreign Application Priority Data

Apr. 2, 2014 (JP) .................................. 2014-076577
Apr. 2, 2014 (JP) .................................. 2014-076579
Apr. 2, 2014 (JP) .................................. 2014-07680

(51) Int. Cl.
*C09J 7/02* (2006.01)
*C08K 3/34* (2006.01)
(Continued)

(52) U.S. Cl.
CPC ................ *C09J 7/383* (2018.01); *B05D 1/36* (2013.01); *B05D 3/108* (2013.01); *B05D 5/00* (2013.01);
(Continued)

(58) Field of Classification Search
CPC ...... C09J 7/0217; C09J 11/04; C09J 2433/00; C09J 133/08; C09J 2201/606;
(Continued)

(56) References Cited

U.S. PATENT DOCUMENTS 6,294,250 B1   9/2001 Date
9,240,131 B2 * 1/2016 Onderisin .............. B31D 1/027
(Continued)

FOREIGN PATENT DOCUMENTS

DE   10 2008 026 951 A1   12/2009
EP      0 279 579 A1       8/1988
(Continued)

OTHER PUBLICATIONS

International Search Report dated Jun. 30, 2015 in PCT/JP2015/060423, filed Apr. 2, 2015.

*Primary Examiner* — Patricia L. Nordmeyer
(74) *Attorney, Agent, or Firm* — Oblon, McClelland, Maier & Neustadt, L.L.P.

(57) ABSTRACT

A pressure sensitive adhesive sheet including, on a substrate or a release material, a resin layer including a resin part (X) containing a resin as a main component, and a particle part (Y) consisting of fine particles and having a surface ($\alpha$) having pressure sensitive adhesiveness and one or more concave portions. When the surface ($\alpha$) of the resin layer is adhered to a smooth surface of a light transmissive adherend to give a laminate, the areal ratio ($S_1$) of the attached area adhered to the smooth surface to the surface ($\alpha$) is 10 to 95% at 23° C. and 50% RH, and the area increase rate $\{[(S_2-S_1)/S_1]\times 100\}$ is −10 to 20% after heating of the smooth surface by statically leaving the laminate at 80° C. for 30 minutes.

10 Claims, 9 Drawing Sheets

(51) Int. Cl.
| | |
|---|---|
| *C09J 133/08* | (2006.01) |
| *C09J 5/00* | (2006.01) |
| *C09J 7/38* | (2018.01) |
| *C09J 201/00* | (2006.01) |
| *B05D 1/36* | (2006.01) |
| *B05D 3/10* | (2006.01) |
| *B05D 5/00* | (2006.01) |
| *C09J 11/04* | (2006.01) |
| *C09J 7/22* | (2018.01) |
| *C09J 7/20* | (2018.01) |
| *C09J 7/25* | (2018.01) |
| *C09J 7/10* | (2018.01) |
| *C09J 121/00* | (2006.01) |
| *C09J 167/00* | (2006.01) |
| *C09J 175/04* | (2006.01) |
| *C08K 3/013* | (2018.01) |
| *C08K 3/36* | (2006.01) |
| *C08K 7/00* | (2006.01) |

(52) U.S. Cl.
CPC .............. *C08K 3/34* (2013.01); *C09J 5/00* (2013.01); *C09J 7/026* (2013.01); *C09J 7/0207* (2013.01); *C09J 7/0217* (2013.01); *C09J 7/0253* (2013.01); *C09J 7/0285* (2013.01); *C09J 7/10* (2018.01); *C09J 7/203* (2018.01); *C09J 7/22* (2018.01); *C09J 7/255* (2018.01); *C09J 7/38* (2018.01); *C09J 7/385* (2018.01); *C09J 11/04* (2013.01); *C09J 121/00* (2013.01); *C09J 133/08* (2013.01); *C09J 167/00* (2013.01); *C09J 175/04* (2013.01); *C09J 201/00* (2013.01); *C08K 3/013* (2018.01); *C08K 3/346* (2013.01); *C08K 3/36* (2013.01); *C08K 7/00* (2013.01); *C08K 2201/003* (2013.01); *C09J 7/02* (2013.01); *C09J 7/20* (2018.01); *C09J 2201/16* (2013.01); *C09J 2201/28* (2013.01); *C09J 2201/36* (2013.01); *C09J 2201/606* (2013.01); *C09J 2205/10* (2013.01); *C09J 2205/102* (2013.01); *C09J 2205/114* (2013.01); *C09J 2400/163* (2013.01); *C09J 2421/00* (2013.01); *C09J 2433/00* (2013.01); *C09J 2467/006* (2013.01); *C09J 2475/00* (2013.01); *C09J 2483/005* (2013.01)

(58) Field of Classification Search
CPC .... C09J 2201/28; C09J 2205/102; C09J 7/02; C09J 7/385; C09J 7/255; C09J 7/203; C09J 7/22; C09J 7/38; C09J 7/10; C09J 7/0207; C09J 7/0253; C09J 7/026; C09J 7/0285; C09J 7/20; C09J 5/00; C09J 201/00; C09J 2201/16; C09J 2201/36; C09J 2205/10; C09J 2205/114; C09J 2400/163; C09J 2421/00; C09J 2467/006; C09J 2475/00; C09J 2483/005; B05D 1/36; B05D 3/108; B05D 5/00; C08K 3/346; C08K 3/36; C08K 3/34; C08K 3/013; C08K 7/00; C08K 2201/003
See application file for complete search history.

(56) References Cited

U.S. PATENT DOCUMENTS

| | | |
|---|---|---|
| 2001/0051264 A1 | 12/2001 | Mazurek et al. |
| 2007/0004065 A1 | 1/2007 | Schardt et al. |
| 2007/0212964 A1* | 9/2007 | Massow ............ C08L 21/00 442/151 |
| 2007/0275203 A1 | 11/2007 | Ludwig |
| 2009/0047500 A1 | 2/2009 | Maeda |
| 2010/0092730 A1 | 4/2010 | Tomino et al. |
| 2010/0209671 A1 | 8/2010 | Kato |
| 2011/0014462 A1 | 1/2011 | Kanda |
| 2013/0011670 A1* | 1/2013 | Tsubaki ............ C08L 23/283 428/353 |
| 2015/0247064 A1 | 9/2015 | Kato et al. |

FOREIGN PATENT DOCUMENTS

| | | |
|---|---|---|
| EP | 3 127 978 A1 | 2/2017 |
| EP | 3 127 982 A1 | 2/2017 |
| JP | 7-53930 A | 2/1995 |
| JP | 2001-507732 | 6/2001 |
| JP | 2002-275433 A | 9/2002 |
| JP | 2004-115766 A | 4/2004 |
| JP | 2006-130672 A | 5/2006 |
| JP | 2007-238846 A | 9/2007 |
| JP | 2008-150431 A | 7/2008 |
| JP | 2009-35609 A | 2/2009 |
| JP | 2009-231413 A | 10/2009 |
| JP | 2010-106239 A | 5/2010 |
| JP | 2011-12198 A | 1/2011 |
| JP | 2011-236370 A | 11/2011 |
| JP | 2012-136717 A | 7/2012 |
| JP | 2012-197332 A | 10/2012 |
| JP | 2012-201877 A | 10/2012 |
| JP | 2013-18163 A | 1/2013 |
| WO | WO 98/08909 A1 | 3/1998 |
| WO | WO 2007/079919 A1 | 7/2007 |
| WO | WO 2008/075767 A1 | 6/2008 |
| WO | WO 2009/048176 A1 | 4/2009 |
| WO | WO 2009/116522 A1 | 9/2009 |

* cited by examiner

Fig. 2
(a)
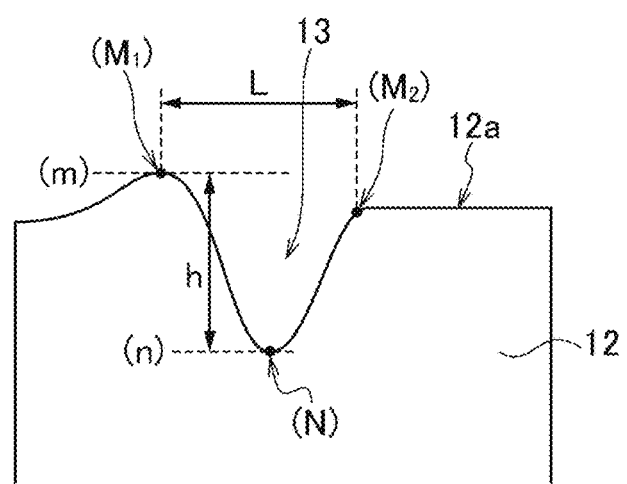
(b)
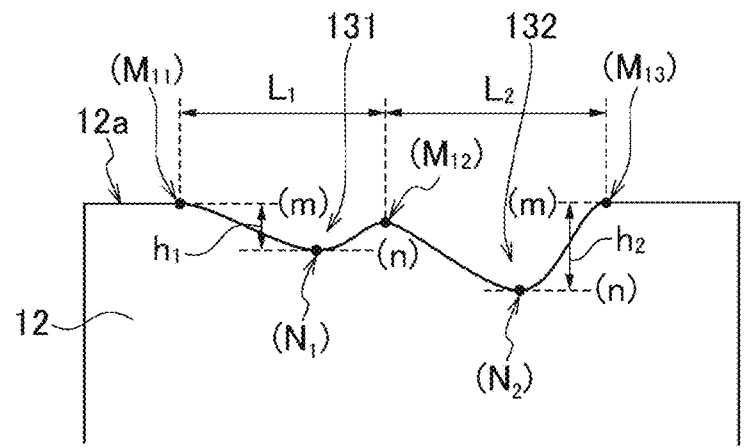

Fig. 4
(a)
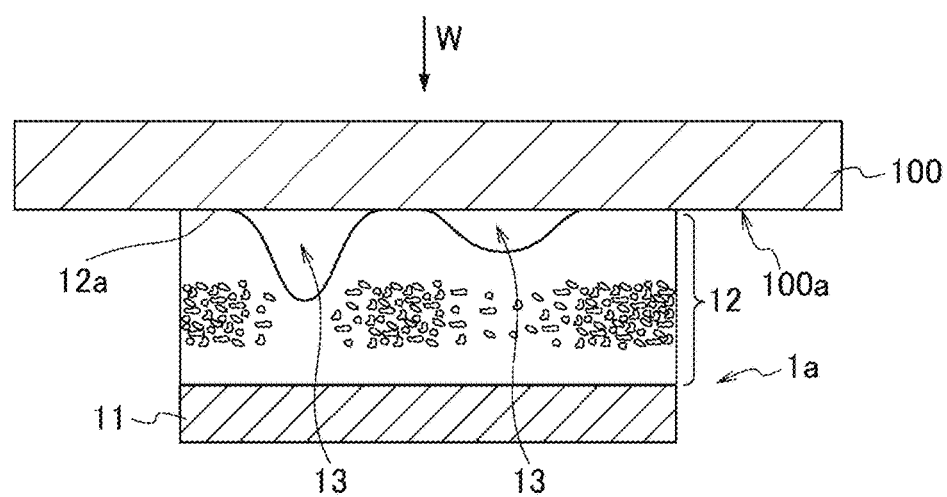
(b)
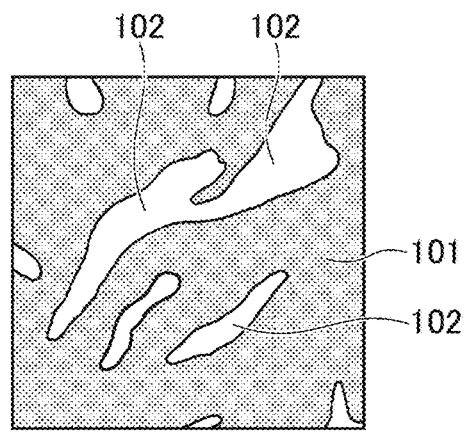

Fig. 5
(a)
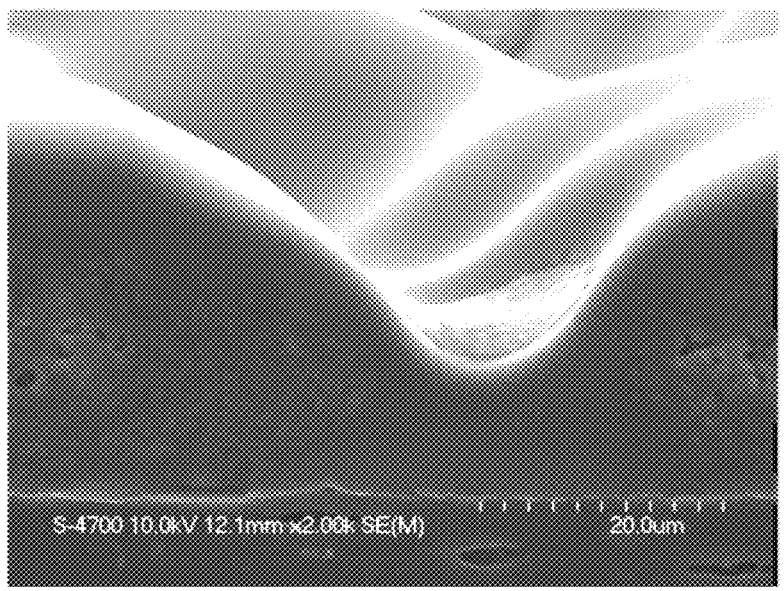
(b)
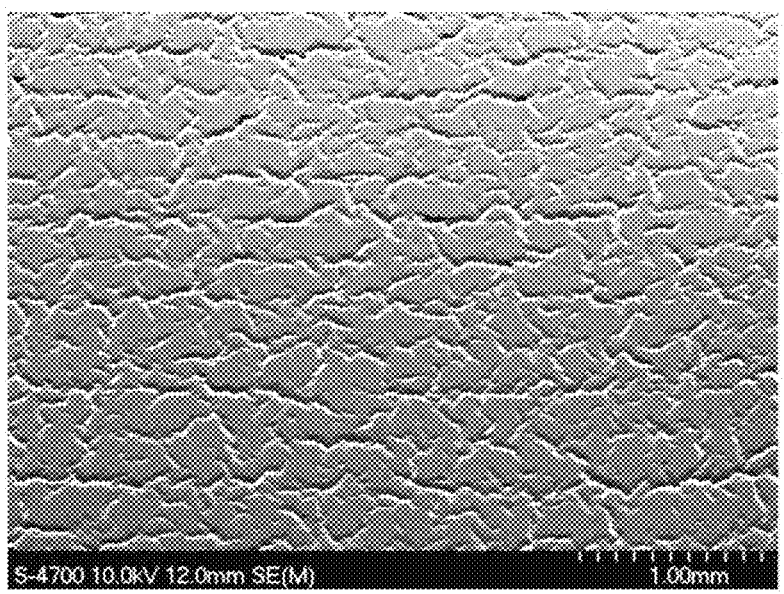

Fig. 6
(a)
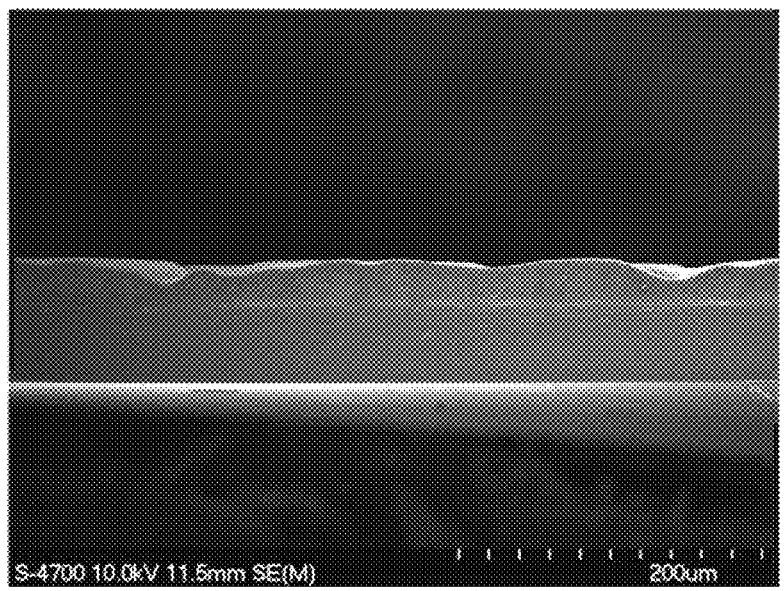
(b)
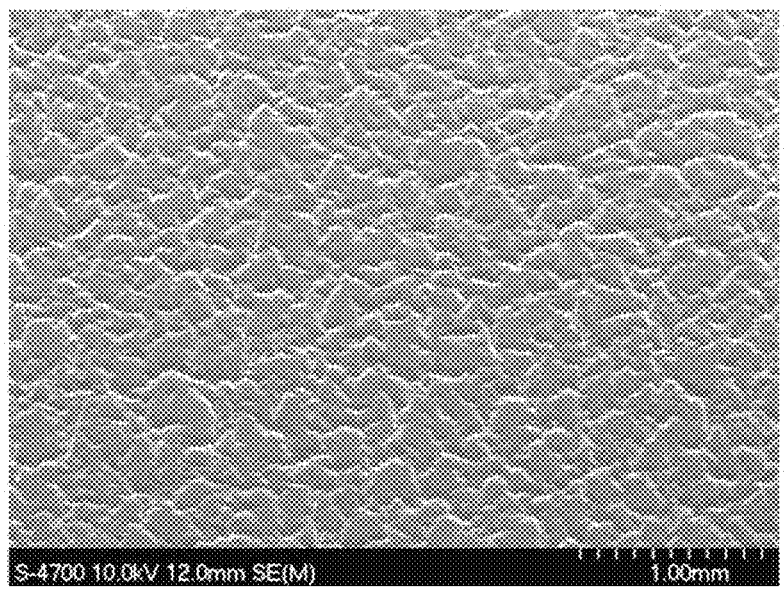

Fig. 7
(a)
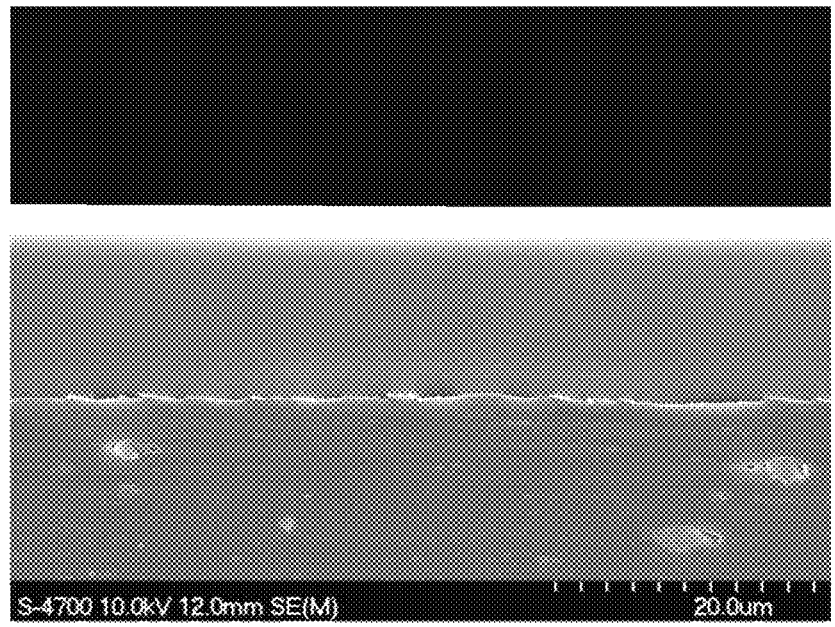
(b)
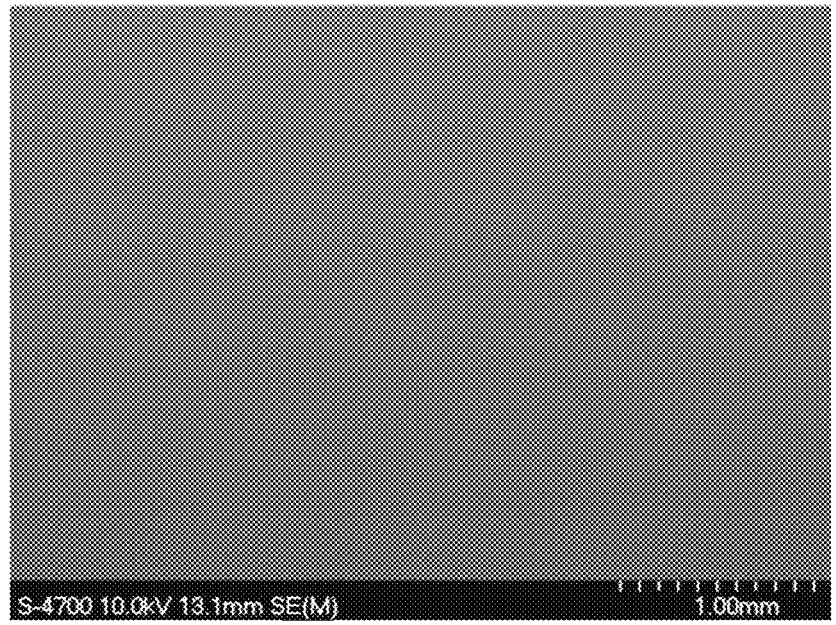

ADHESIVE SHEET AND METHOD FOR PRODUCING SAME

TECHNICAL FIELD

The present invention relates to a pressure sensitive adhesive sheet and a method for producing the same.

BACKGROUND ART

A general pressure sensitive adhesive sheet is constituted by a substrate, a pressure sensitive adhesive layer formed on the substrate, and a release material provided on the pressure sensitive adhesive layer depending on necessity, and in use, after removing the release material in the case where the release material is provided, the general pressure sensitive adhesive sheet is attached to an adherend by making the pressure sensitive adhesive layer into contact therewith.

A pressure sensitive adhesive sheet having a large attaching area, which may be used for identification or decoration, masking for painting, surface protection of a metal plate or the like, and the like, has a problem that on attaching the sheet to an adherend, air accumulation is liable to occur between the pressure sensitive adhesive layer and the adherend, and the portion with the air accumulation is recognized as "blister", so as to prevent the pressure sensitive adhesive sheet from being attached cleanly to the adherend.

For solving the problem, for example, PTL 1 describes a pressure sensitive adhesive sheet having grooves with a particular shape that are disposed artificially in a prescribed pattern on the surface of the pressure sensitive adhesive layer by making a release material having a fine emboss pattern into contact with the surface of the pressure sensitive adhesive layer.

There is described that, by using the pressure sensitive adhesive sheet, it is possible to escape the "air accumulation" formed on attaching to an adherend, to the exterior through the grooves formed artificially on the surface of the pressure sensitive adhesive layer.

CITATION LIST

Patent Literature

PTL 1: JP 2001-507732 A

SUMMARY OF INVENTION

Technical Problem

However, a pressure sensitive adhesive sheet having a pressure sensitive adhesive layer where grooves having a specific shape are simply arranged in a predetermined pattern, such as that described in PTL 1, has a problem in that, when the width of the groove is narrow, air could hardly go through it, but when the groove width is broad, not only the surface substrate may get dented to worsen the appearance thereof but also the adhesive strength of the sheet may lower.

In addition, the pressure sensitive adhesive sheet described in PTL 1 is poor in blister resistance and therefore, when used at a high temperature, there may occur a problem in that the pressure sensitive adhesive sheet may blister. Further, when used at a high temperature, the shape given by an embossed liner could not be maintained (the shape retentivity may worsen) and, as a result, there may occur a problem in that the air escape property would lower. Further, when the pressure sensitive adhesive sheet whose groove shape retentivity is low is left at a high temperature, the groove may disappear and the pressure sensitive adhesive sheet may be blistered owing to the vapor generated from the pressure sensitive adhesive and the adherend.

An object of the present invention is to provide a pressure sensitive adhesive sheet having excellent air escape property capable of easily removing air accumulation to be formed in adhering an adherend to the pressure sensitive adhesive sheet not only at room temperature but also even at a high temperature, and having good blister resistance and pressure sensitive adhesion characteristics, and to provide a method for producing the pressure sensitive adhesive sheet.

Solution to Problem

The present inventors have found that a pressure sensitive adhesive sheet having a resin layer that includes a resin part containing a resin as a main component and a particle part consisting of fine particles, wherein the resin layer has one or more concave portions on the pressure sensitive adhesive surface thereof, and when the pressure sensitive adhesive surface is adhered to a smooth surface of a light transmissive adherend having a smooth surface, the areal ratio of the attached area to the smooth surface of the light transmissive adherend in the surface falls within a specific range, can solve the above-mentioned problems, and have completed the present invention.

Specifically, the present invention provides the following [1] to [9].

[1] A pressure sensitive adhesive sheet containing, on a substrate or a release material, a resin layer that includes a resin part (X) containing a resin as a main component, and a particle part (Y) consisting of fine particles, at least a surface ($\alpha$) of the resin layer being opposite to the side thereof on which the substrate or the release material is provided has pressure sensitive adhesiveness, wherein one or more concave portions exist on the surface ($\alpha$), when the surface ($\alpha$) of the resin layer is adhered to a smooth surface of a light transmissive adherend having a smooth surface to give a laminate, the pressure sensitive adhesive sheet satisfies the following requirements (1) and (2):

Requirement (1): in an environment at 23° C. and 50% RH, the areal ratio ($S_1$) of the attached area against the smooth surface of the light transmissive adherend to the surface ($\alpha$) before heating is 10 to 95%; and Requirement (2): after the laminate is statically left in an environment at 80° C. for 30 minutes, the area increase rate $\{[(S_2-S_1)/S_1]\times 100\}$ calculated from the areal ratio ($S_2$) of the attached area after heating of the smooth surface of the light transmissive adherend to the surface ($\alpha$) and the areal ratio ($S_1$) thereof before heating, is −10 to 20%.

[2] The pressure sensitive adhesive sheet according to [1], wherein a mass retention rate after heating the resin layer at 800° C. for 30 minutes is 3 to 90% by mass.

[3] The pressure sensitive adhesive sheet according to [1] or [2], wherein a volume-average secondary particle diameter of the fine particles constituting the particle part (Y) is 1 to 70% of the thickness of the resin layer.

[4] The pressure sensitive adhesive sheet according to any of [1] to [3], wherein the fine particles constituting the particle part (Y) are not exposed out on the surface ($\alpha$).

[5] The pressure sensitive adhesive sheet according to any of [1] to [4], wherein the resin layer has a multi-layer structure containing a layer (X$\beta$) mainly containing the resin part (X), a layer (Y1) containing the particle part (Y) in an amount of 15% by mass or more, and a layer (Xα) mainly containing the resin part (X), as laminated in this order from the side on which the substrate or the release material is provided.

[6] The pressure sensitive adhesive sheet according to [5], wherein:

the layer (Xβ) is a layer formed by a composition (xβ) containing the resin as a main component, the layer (Y1) is a layer formed by a composition (y) containing the fine particles in an amount of 15% by mass or more, and the layer (Xα) is a layer formed by a composition (xα) containing the resin as a main component.

[7] A method for producing a pressure sensitive adhesive sheet according to any of [1] to [4], which includes at least the following steps (1) and (2):

step (1): a step of forming a coating film (x') formed by a composition (x) containing the resin as a main component, and a coating film (y') formed by a composition (y) containing the fine particles in an amount of 15% by mass or more; and step (2): a step of drying the coating film (x') and the coating film (y') formed in the step (1) simultaneously.

[8] A method for producing a pressure sensitive adhesive sheet according to [6], which includes at least the following steps (1A) and (2A):

step (1A): a step of forming, on a substrate or a release material, a coating film (xβ') formed by the composition (xβ) containing the resin as a main component, a coating film (y') formed by the composition (y) containing the fine particles in an amount of 15% by mass or more and a coating film (xα') formed by the composition (xα) containing the resin as a main component, by laminating in this order; and step (2A): a step of drying the coating film (xβ'), the coating film (y') and the coating film (xα') formed in the step (1A) simultaneously.

[9] A method for producing a pressure sensitive adhesive sheet according to [6], which includes at least the following steps (1B) and (2B):

step (1B): a step of forming, on the layer (Xβ) mainly containing a resin part (X) that is provided on a substrate or a release material, a coating film (y') formed by the composition (y) containing the fine particles in an amount of 15% by mass or more and a coating film (xα') formed by the composition (xα) containing the resin as a main component, by laminating in this order; and step (2B): a step of drying the coating film (y') and the coating film (xα') formed in the step (1B) simultaneously.

Advantageous Effects of Invention

According to the present invention, there may be provided a pressure sensitive adhesive sheet having excellent air escape property capable of readily removing air accumulation that may be formed on attaching to an adherend not only at room temperature but also even at a high temperature, and has good blister resistance and pressure sensitive adhesion characteristics, and a method for producing the pressure sensitive adhesive sheet.

BRIEF DESCRIPTION OF DRAWINGS

FIG. 2 is a schematic cross sectional view showing an example of the shape of the resin layer on the side of the surface (α) of the pressure sensitive adhesive sheet of the present invention.

FIG. 4 is a schematic illustration showing the method for measuring the area ratio of the attached area to a smooth surface of a light transmissive adherend in the surface (α) of the resin layer on attaching the surface (α) to the smooth surface of the light transmissive adherend.

FIG. 5 is images of the pressure sensitive adhesive sheet produced in Example 1, taken through a scanning electron microscope; and (a) of FIG. 5 is an image of a cross section of the pressure sensitive adhesive sheet, and (b) of FIG. 5 is a perspective image in observation of the side of the surface (α) of the resin layer of the pressure sensitive adhesive sheet.

FIG. 6 is images obtained by observing the pressure sensitive adhesive sheet produced in Example 10 with a scanning electron microscope, in which (a) of FIG. 6 is an image of a cross section of the pressure sensitive adhesive sheet, and (b) of FIG. 6 is a perspective image in observation on the side of the surface (α) of the resin layer of the pressure sensitive adhesive sheet.

FIG. 7 is images obtained by observing the pressure sensitive adhesive sheet produced in Comparative Example 1 with a scanning electron microscope, in which (a) of FIG. 7 is a cross sectional image of the pressure sensitive adhesive sheet, and (b) of FIG. 7 is a perspective image in observation on the side of the surface (α) of the resin layer of the pressure sensitive adhesive sheet.

DESCRIPTION OF EMBODIMENTS

Figure 1:
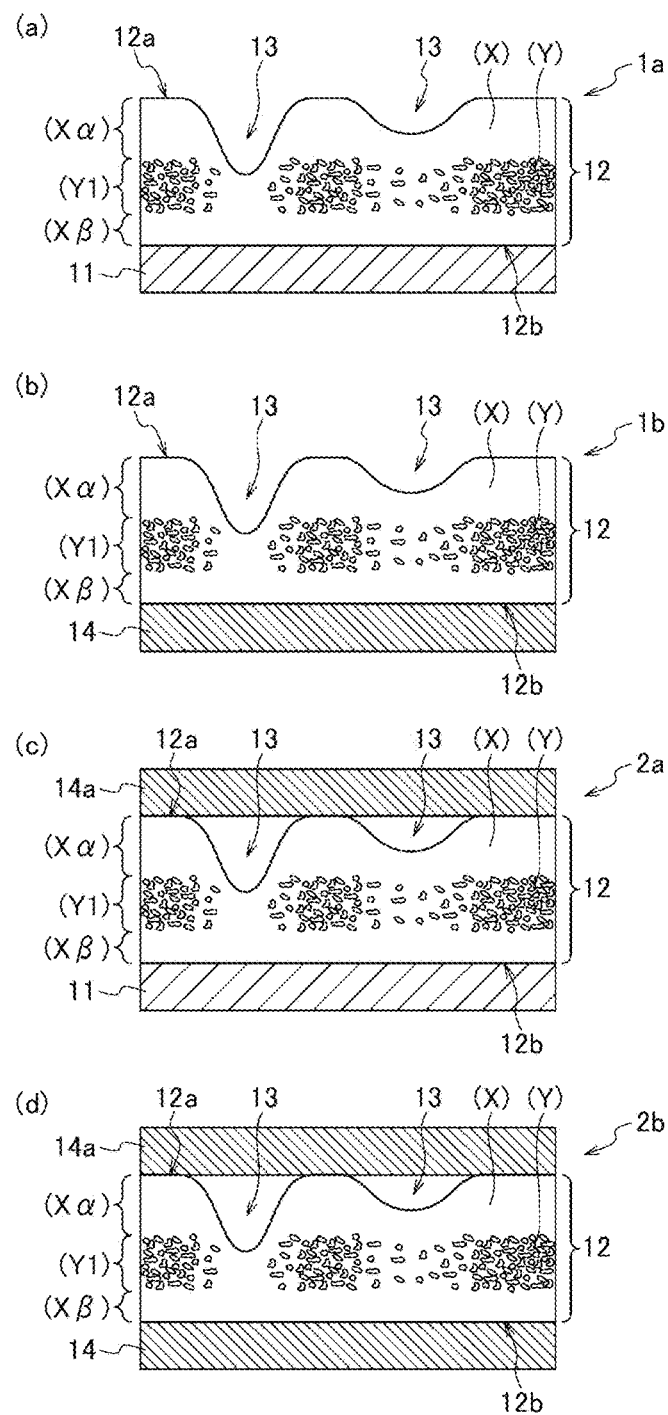
FIG. 1 is a schematic cross sectional view showing an example of the structure of the pressure sensitive adhesive sheet of the present invention.

In the present invention, for example, an expression "YY containing a component XX as a main component" or an expression "YY mainly containing a component XX" means that "among the components contained in YY, a component having a largest content is the component XX". A concrete content of the component XX in this expression is generally 50% by mass or more, and is preferably 65 to 100% by mass, more preferably 75 to 100% by mass, even more preferably 85 to 100% by mass, relative to the total amount (100% by mass) of YY.

In the present invention, for example, "(meth)acrylic acid" indicates both "acrylic acid" and "methacrylic acid", and the same shall apply to other similarity terms.

Regarding a preferred numerical range (for example, a range of content or the like), a lower limit and an upper limit that are expressed in stages can be combined each independently. For example, from an expression of "preferably 10 to 90, more preferably 30 to 60", "the preferred lower limit (10)" and "the preferred upper limit (60)" may be combined to be "10 to 60".

[Configuration of Pressure Sensitive Adhesive Sheet]

First, the constitution of the pressure sensitive adhesive sheet of the present invention is described.

The pressure sensitive adhesive sheet of the present invention has, on a substrate or a release material, a resin layer that includes a resin part (X) containing a resin as a main component, and a particle part (Y) containing fine particles.

FIG. 1 includes schematic cross-sectional views of pressure sensitive adhesive sheets, showing examples of a configuration of the pressure sensitive adhesive sheet of the present invention.

As specific configurations of a pressure sensitive adhesive sheet that are embodiments of the present invention, for example, there are mentioned a pressure sensitive adhesive sheet 1a having a resin layer 12 on a substrate 11 as shown by FIG. 1(a), and a pressure sensitive adhesive sheet 1b having a resin layer 12 on a release material 14 as shown by FIG. 1(b).

In the pressure sensitive adhesive sheet of the present invention, at least a surface (α) 12a of the resin layer 12 on the side opposite to the side on which the substrate 11 or the release material 14 is provided (hereinafter this may be simply referred to as "surface (α)") has pressure sensitive adhesiveness.

Accordingly, from the viewpoint of handleability, the pressure sensitive adhesive sheet of the embodiment of the present invention preferably has a configuration of a pressure sensitive adhesive sheet 2a or 2b as shown by FIG. 1(c) or FIG. 1(d), where a release material 14a is further arranged on the surface (α) 12a of the resin layer 12 in the pressure sensitive adhesive sheet 1a or 1b shown in FIG. 1.

In the pressure sensitive adhesive sheet of the embodiment of the present invention, the surface (β) 12b of the resin layer 12 on the side which the substrate 11 or the release material 14 is provided (hereinafter this may be simply referred to as "surface (β)") may also have pressure sensitive adhesiveness. When the surface (β) also has pressure sensitive adhesiveness, in the pressure sensitive adhesive sheet 1a or 2a shown by FIG. 1(a) or FIG. 1(c), the adhesion between the resin layer 12 and the substrate 11 can be good, and the pressure sensitive adhesive sheet 1b or 2b shown by FIG. 1(b) or FIG. 1(d) may be a double-sided pressure sensitive adhesive sheet.

The resin layer 12 that the pressure sensitive adhesive sheet of the present invention has is a layer that contains a resin part (X) containing a resin as a main component, and a particle part (Y) consisting of fine particles, and the surface (α) 12a of the resin layer 12 has concave portions 13 existing thereon.

Regarding the distribution pattern of the resin part (X) and the particle part (Y) in the resin layer 12, the resin parts (X) and the particle parts (Y) may be distributed almost evenly as one pattern, or as a different pattern, an area mainly containing the resin parts (X) and an area mainly containing the particle parts (Y) may be locally divided.

In addition, as shown by FIG. 1(a) to FIG. 1(d), in the area where the one or more concave portions 13 exist on the surface (α) of the resin layer 12, the pattern may be such that the proportion of the particle parts (Y) is smaller than in the other areas, or the particle parts (Y) may not be partly present.

In a planar view of the concave portion 13 existing on the surface (α), the length of the concave portion 13 is not specifically limited. Namely, the concave portion 13 includes a relatively long groove-like one or a relatively short pit-like one.

The concave portions on the surface (α) of the resin layer that the pressure sensitive adhesive sheet of the present invention has may be grooves having a previously-planned shape, such as those to be formed through embossed pattern transfer, or may be those having an irregular shape that is not a planned shape to be formed by embossed patterning. In consideration of good air escape property and blister resistance, the concave portions are preferably those having an irregular shape that is not a planned shape to be formed by embossed patterning (hereinafter referred to as "unplanned shape").

Here, in the case where the concave portions are grooves having a previously planned shape, such as those to be formed through embossed pattern transfer, the cross-sectional profile thereof (the cross section of the concave portion in the thickness direction of the resin layer) may be a polygonal or arc-like one, or a shape of a combination thereof, and the grooves are formed at certain regularity. Such grooves may be formed according to a known method.

In the case where the concave portions are grooves having a previously planned shape, such as those to be formed through embossed pattern transfer, the concave portions may have the following problems.

(1) In the case where the grooves are formed in a predetermined pattern, the adhesive strength at the site where the grooves are arranged is locally poor, and when the pressure sensitive adhesive sheet is adhered to an adherend, the sheet may peel off from the site.

On the other hand, when the pressure sensitive adhesive sheet is, after adhered to an adherend, peeled off, the pressure sensitive adhesion characteristics of the pressure sensitive adhesive sheet varies locally, and therefore, depending on the direction in which the pressure sensitive adhesive sheet is peeled away, some pressure sensitive adhesive may remain on the adherend. For example, in the case of a pressure sensitive adhesive sheet having a pressure sensitive adhesive layer with lattice-like grooves arranged thereon, when the pressure sensitive adhesive sheet is peeled away in an oblique direction, the pressure sensitive adhesive may remain on the adherend.

Further, in the case where the pressure sensitive adhesive sheet is blanked, the groove arrangement pattern and the blanking pattern may overlap with each other. In the case, the cutting depth may vary, therefore providing a problem in that the pressure sensitive adhesive sheet could not be suitably slit.

(2) In general, for readily peeling the release material attached to the pressure sensitive adhesive sheet, the release material alone is cut to form a cleavage line for peeling (for so-called back cleavage line formation). In the case of the step, in general, the release material is once peeled from the pressure sensitive adhesive sheet, and then the release material is given a cleavage line, and then the release material and the pressure sensitive adhesive layer of the pressure sensitive adhesive sheet are again laminated.

However, in the pressure sensitive adhesive sheet described in PTL 1, an embossed liner is used as a release material, and therefore in again laminating the release material and the pressure sensitive adhesive layer, the layer could hardly follow the embossed pattern of the release material, and consequently in the case, another non-embossed release material must be prepared.

(3) In PTL 1, a pressure sensitive adhesive is once applied onto the embossed liner to form a pressure sensitive adhesive layer thereon, and then the pressure sensitive adhesive layer is laminated on a substrate for forming the microstructure in the pressure sensitive adhesive layer (a so-called transfer coating method is employed). However, when a substrate having a low-polar surface, such as a polyolefin substrate or the like is used, the method could not realize a sufficient adhesion in the interface between the substrate and the pressure sensitive adhesive layer.

Moreover, different from a release material made of paper, the release material of a resin film could hardly form a fine embossed pattern on the pressure sensitive adhesive layer.

As opposed to this, one or more concave portions not having a planned profile such as an embossed pattern but having a non-planned profile differ from the grooves having a previously planned shape such as those to be formed by pressing an embossed pattern-having release material onto the surface of a resin layer, as described above. Accordingly, the case is free from the above-mentioned problems.

Consequently, the one or more concave portions existing on the surface ($\alpha$) of the resin layer of one embodiment of the pressure sensitive adhesive sheet of the present invention are preferably not those formed through embossed pattern transfer of, for example, pressing an embossed pattern-having release material onto the surface of the resin layer.

The resin layer 12 includes a layer configuration of a multilayer structure formed by laminating a layer (X$\beta$) mainly containing a resin part (X), a layer (Y1) containing a particle part (Y) in an amount of 15% by mass or more and a layer (X$\alpha$) mainly containing a resin part (X), as laminated in this order from the side having a substrate or a release material, like in the pressure sensitive sheet 1a of FIG. 1.

The configuration of the multilayer structure mentioned above may also be a mixed layer configuration where the boundary between the layer (X$\beta$) and the layer (Y1), and/or the boundary between the layer (Y1) and the layer (X$\alpha$) could not be discerned.

The layer (X$\beta$) and the layer (X$\alpha$) are layers mainly containing the resin part (X) but may also contain a particle part (Y). However, the content of the particle part (Y) in the layer (X$\beta$) and the layer (X$\alpha$) is each independently less than 15% by mass relative to the total mass (100% by mass) of the layer (X$\beta$) or the layer (X$\alpha$) and is smaller than the content of the resin constituting the resin part (X).

The layer (X$\beta$) and the layer (X$\alpha$) may have a void part (Z) to be mentioned hereinunder, in addition to the resin part (X) and the particle part (Y).

The content of the resin in the layer (X$\beta$) and the layer (X$\alpha$) is each independently generally 50 to 100% by mass, and is preferably 65 to 100% by mass, more preferably 75 to 100% by mass, even more preferably 85 to 100% by mass, still more preferably 90 to 100% by mass, relative to the total mass (100% by mass) of the layer (X$\beta$) or the layer (X$\alpha$).

In the present invention, the "content of the resin in the layer (X$\beta$) and the layer (X$\alpha$)" may be considered to be the content of the resin in the total amount (100% by mass (but excluding diluent solvent)) of the resin composition that is the forming material for the layer (X$\beta$) or the layer (X$\alpha$).

The content of the fine particles constituting the particle part (Y) in the layer (X$\beta$) and the layer (X$\alpha$) is each independently less than 15% by mass relative to the total mass (100% by mass) of the layer (X$\beta$) or the layer (X$\alpha$), but is preferably 0 to 13% by mass, more preferably 0 to 10% by mass, even more preferably 0 to 5% by mass, still more preferably 0% by mass, relative to the total mass (100% by mass) of the layer (X$\beta$) or the layer (X$\alpha$).

In the present invention, the "content of the fine particles in the layer (X$\beta$) and the layer (X$\alpha$) may be considered to be the content of the fine particles in the total amount (100% by mass (but excluding diluent solvent)) of the resin composition that is the forming material for the layer (X$\beta$) or the layer (X$\alpha$).

Preferably, the layer (X$\beta$) and the layer (X$\alpha$) each are a layer formed of a composition (x$\beta$) or (x$\alpha$) containing a resin as a main component to be mentioned hereinunder.

The layer (Y1) containing the particle part (Y) in an amount of 15% by mass or more may be a layer formed of the particle part (Y) alone or may also be a layer containing the resin part (X) along with the particle part (Y), and may further has a void part (Z) to be mentioned hereinunder.

The content of the fine particles constituting the particle part (Y) in the layer (Y1) is 15% by mass or more relative to the total mass (100% by mass) of the layer (Y1), but is preferably 20 to 100% by mass, more preferably 25 to 90% by mass, even more preferably 30 to 85% by mass, still more preferably 35 to 80% by mass, relative to the total mass (100% by mass) of the layer (Y1).

In the present invention, the "content of the fine particles in the layer (Y1)" may also be considered to be the content of the fine particles in the total amount (100% by mass (but excluding diluent solvent)) of the composition that is the forming material for the layer (Y1).

The content of the resin in the layer (Y1) is generally 1 to 85% by mass, and is preferably 5 to 80% by mass, more preferably 10 to 75% by mass, even more preferably 20 to 70% by mass, still more preferably 25 to 65% by mass, relative to the total mass (100% by mass) of the layer (Y1).

In the present invention, the "content of the resin in the layer (Y1)" may also be considered to be the content of the resin in the total amount (100% by mass (but excluding diluent solvent)) of the composition that is the forming material for the layer (Y1).

Preferably, the layer (Y1) is formed of a composition (y) containing fine particles in an amount of 15% by mass or more to be mentioned hereinunder.

The pressure sensitive adhesive sheet of the present invention has plural concave portions 13 on the surface ($\alpha$) of the resin layer 12 on the side opposite to the side on which the substrate 11 or the release material 14 is provided, as shown in FIG. 1(*a*) to (*d*). The concave portions 13 existing on the surface ($\alpha$) play a role of air-discharge channels for removing outside the "air accumulation" to be formed in adhering the pressure sensitive adhesive sheet of the present invention to an adherend.

With that, the pressure sensitive adhesive sheet of the present invention satisfies the following requirements (1) and (2) when the surface ($\alpha$) of the resin layer therein is adhered to a smooth surface of a light transmissive adherend having a smooth surface to give a laminate.

Requirement (1): In an environment at 23° C. and 50% RH (relative humidity), the areal ratio ($S_1$) of the one or more attached areas against the smooth surface of the light transmissive adherend to the surface (α) before heating is 10 to 95%.

Requirement (2): After the laminate is statically left in an environment at 80° C. for 30 minutes, the area increase rate $\{[(S_2-S_1)/S_1]\times100\}$ calculated from the areal ratio ($S_2$) of the one or more attached areas after heating of the smooth surface of the light transmissive adherend to the surface (α) and the areal ratio ($S_1$) thereof before heating, is −10 to 20%.

<Requirement (1)>

As in the requirement (1), when the surface (α) of the resin layer in the pressure sensitive adhesive sheet of the present invention is adhered to a smooth surface of a light transmissive adherend having a smooth surface, the areal ratio ($S_1$) of the one or more attached areas against the smooth surface of the light transmissive adherend to the surface (α) (hereinafter this may be simply referred to as "areal ratio of the attached area") is 10 to 95%.

Here, when the areal ratio of the one or more attached areas is less than 10%, the adhesion face between the surface (α) of the resin layer and the adherend could not be sufficiently secured and the pressure sensitive adhesion characteristics may lower, therefore providing a possibility that the adherend may peel away from the pressure sensitive adhesive sheet. In addition, the appearance of the resultant pressure sensitive adhesive sheet is poor.

On the other hand, when the areal ratio of the one or more attached areas is more than 95%, the air escape property of the pressure sensitive adhesive sheet is insufficient, and the air accumulation which may be formed in attaching the adhesive sheet to an adherend could hardly be removed.

From the above-mentioned viewpoints, the ratio of the attached area to the adherend is preferably 20 to 93%, more preferably 30 to 90%, even more preferably 35 to 85%, still more preferably 40 to 75%, further more preferably 45 to 70%.

The "light transmissive adherend having a smooth surface" in the requirement (1) is to merely define the adherend to be used in measurement of the areal ratio of the one or more attached areas in the surface (at) defined in the requirement and is not intended to define the adherend that may be the object to which the pressure sensitive adhesive sheet of the present invention is to be attached.

The adherend that may be the object to which the pressure sensitive adhesive sheet is to be attached is not specifically limited in point of the presence or absence of a smooth surface and in point of the presence or absence of translucency, and for example, it may be a non-light transmissive adhered having a curved surface.

The "smooth surface" in the requirement (1) means a surface whose centerline mean roughness ($Ra_{75}$) defined in JIS B0601:2001 is 0.1 μm or less.

The "translucency" in the requirement (1) means a characteristic having a total light transmittance of 70% or more as measured according to JIS K7105.

The shaping material for the light transmissive adherend in the requirement (1) is not specifically limited, but is, from the viewpoint of the ability to readily form the light transmissive adherend having a smooth surface as defined in the above, preferably glass.

Figure 3:
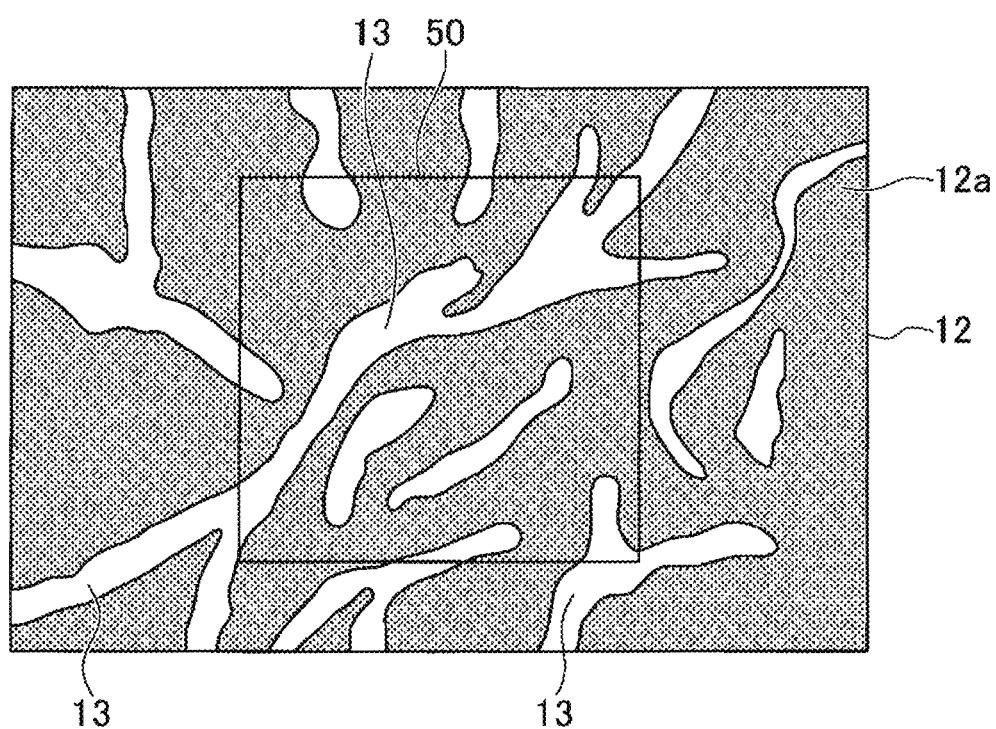
FIG. 3 is a schematic plan view showing an example of the surface (α) of the resin layer of the pressure sensitive adhesive sheet of the present invention.

In the present invention, as shown in FIG. 3, ten "regions surrounded by an arbitrarily selected square 50 of 1 to 10 mm on a side" on the surface (α) are arbitrarily selected on the surface (α) 12a, and a value of the areal ratio of the one or more attached areas in each region is calculated and a mean value of the values in 10 regions may be considered to be the "areal ratio of the one or more attached areas in the surface (α)" of the targeted pressure sensitive adhesive sheet. In addition, a mean value of the values of the areal ratio of the one or more attached areas as calculated according to the following operations (i) to (iii), more specifically according to the method described in the section of Examples may also be considered to be the "areal ratio of the one or more attached areas in the surface (α)" of the targeted pressure sensitive adhesive sheet.

Operation (i): As shown in FIG. 4(a), the pressure sensitive adhesive sheet to be measured is statically put on a smooth surface 100a of a light transmissive adherend 100 formed of glass or the like, in such a manner that the surface (α) 12a of the resin layer 12 that the targeted pressure sensitive adhesive sheet has could be in contact with the smooth surface 100a. With that, on the side of the substrate or the release material of the pressure sensitive adhesive sheet, a 2-kg roller (application device defined by JIS Z 0237:2000 10.2.4) is run by 5 reciprocating motions to thereby adhere the surface (ac) 12a of the resin layer 12 and the smooth surface 100a of the light transmissive adherend 100. Accordingly, a laminate as arranged in the direction shown in FIG. 4(a) is obtained.

Operation (ii): On the side of the light transmissive adherend 100 of the laminate obtained in the operation (i), an interface between the smooth surface 100a of the light transmissive adherend 100 and the surface (α) 12a of the resin layer in an arbitrarily selected region on the surface (α) 12a is photographed in the direction W in FIG. 4(a), using a digital microscope, thereby giving a digital image of the selected region.

Operation (iii): Using image analysis software, the resultant digital image is processed (binarization) to give a binarized image. With that, on the binarized image, the area S of the one or more attached areas that is in contact with the smooth surface of the light transmissive adherend in the total area of the selected region is determined. Next, based on a math formula "[areal ratio (%) of one or more attached areas]=S/ total area of selected region×100], the areal ratio of the one or more attached areas to the light transmissive adherend in the selected region is calculated.

The kind of the light transmissive adherend to be used for the measurement and specific methods of the operations (i) to (iii) are as described in the section of Examples.

As the digital microscope, for example, "Digital Microscope VHX-1000" or "Digital Microscope VHX-5000", both trade names manufactured by Keyence Corporation may be used. Depending on the measurable magnifications of the digital microscope, the number of the areas to be measured may be increased and the areal ratio (%) of the one or more attached areas may be calculated.

FIG. 4(b) is referred to. In a region (Q) arbitrarily selected, for example, surrounded by a square 50 having an edge length of 1 mm on the surface (α) 12a of the resin layer shown in FIG. 3, the surface (α) 12a is attached to the smooth surface 100a of the light transmissive adherend 100 as shown in FIG. 4(a), and the state of the one or more attached areas against the adherend in the region (Q) in a planar view in the direction W on the side of the light transmissive adherend 100 is schematically shown by FIG. 4(b).

The schematic view of the region (Q) after the light transmissive adherend has been attached to the pressure sensitive adhesive sheet in FIG. 4(b), and the region (Q) surrounded by the square 50 in FIG. 3 are compared with each other. The non-attached area 102 of the light transmissive adherend in FIG. 4(b) is smaller than the part occupied by the concave portion 13 inside the region (Q) in FIG. 3.

This is because, though the surface (α) has pressure sensitive adhesiveness, the site having a relatively small height difference in the concave portion 13 is kept in contact with the smooth surface of the light transmissive adherend when the surface (α) is attached to the light transmissive adherend.

Namely, the non-attached area 102 to the smooth surface of the light transmissive adherend does not always conform to the part occupied by plural concave portions 13 shown in FIG. 3.

In FIG. 4(*b*), the non-attached area 102 to the smooth surface of the light transmissive adherend is a site having a large height difference in the configuration of the concave portion 13. Accordingly, it may be said that, when the ratio of the non-attached area 102 is larger, the effect of expressing the air escape property to let "air accumulation" outside could be higher.

From the viewpoint of providing a pressure sensitive adhesive sheet having an increased air escape property, it is desirable that the shapes of the one or more attached areas against the smooth surface of the light transmissive adherend to the surface (α) is, when the surface (α) is attached to the smooth surface of a light transmissive adherend having a smooth surface, visually recognizable from the side of the light transmissive adherend.

<Requirement (2)>

As in the requirement (2), after the laminate is statically left in an environment at 80° C. for 30 minutes, the area increase rate $\{[(S_2-S_1)/S_1] \times 100\}$ calculated from the areal ratio ($S_2$) of the one or more attached areas after heating of the smooth surface of the light transmissive adherend to the surface (α) and the areal ratio ($S_1$) thereof before heating, is −10 to 20%.

When the area increase rate $\{[(S_2-S_1)/S_1] \times 100\}$ is less than −10%, the area of the one or more attached areas decreases after the heating, therefore providing a problem of causing reduction of adhesive strength. When the area increase rate is more than 20%, the area of the one or more attached areas increases while the area of the one or more concave portions decreases, therefore resulting in that the one or more concave portion's shapes retentivity lower. The area increase rate is preferably −6 to 14%, more preferably −3 to 8%, even more preferably −1 to 5%, still more preferably −0.5 to 3%.

The areal ratio ($S_2$) of the one or more attached areas after heating to the smooth surface of the light transmissive adherend can be determined according to the method for determination of $S_1$ in the requirement (1) after the laminate is statically kept in an environment at 80° C. for 30 minutes. The area increase rate $\{[(S_2-S_1)/S_1] \times 100\}$ can be calculated from $S_1$ and $S_2$.

<Shapes of One or More Attached Area>

Further, from the viewpoint of providing a pressure sensitive adhesive sheet having well-balanced characteristics of air escape property, appearance, pressure sensitive adhesion characteristics and punching property, it is desirable that, in one embodiment of the pressure sensitive adhesive sheet of the present invention, when the surface (α) of the resin layer is attached to the smooth surface of a light transmissive adherend having a smooth surface, the shapes of the one or more attached areas to the smooth surface of the adherend in the surface (α) of the resin layer (hereinafter this may be simply referred to as "the shapes of the one or more attached areas") have irregular shapes.

The wording "the shapes of the one or more attached areas have irregular shapes" means that in a planar view of the shapes of the one or more attached areas, the shapes of the attached areas do not have any specific shape such as a shape surrounded by a circle or a line alone (triangle, square, etc.) but have irregular shapes with no similarities between the shapes of the individual attached areas, like the shape of the attached area 101 in FIG. 4(*b*). In other words, the shapes of the one or more attached areas to be formed through embossed pattern transfer of pressing an embossed pattern-having release material to the surface of the resin layer could not be said to have "irregular shapes".

For the judgement whether or not the shapes of the one or more attached areas have irregular shapes, in principle, the laminate obtained in the above-mentioned operation (i) is observed visually or with a digital microscope in the direction W in FIG. 4(*a*).

However, like that for the calculation method for the areal ratio of the one or more attached areas, it is also possible that arbitrarily selected ten "regions surrounded by a square of 1 to 10 mm on a side" on the surface (α) are selected, and the 10 digital images obtained through the above-mentioned operations (i) and (ii) are processed for the judgement.

Namely, in observation of the shapes of the one or more attached areas in each region shown in each digital image, when all the digital images of those ten regions are so judged that the shapes of the one or more attached areas therein have irregular shapes, it may be considered that "the shapes of the one or more attached areas against the pressure sensitive adhesive sheet have irregular shapes".

<Shapes of One or More Concave Portion>

Preferably, the shapes of the one or more concave portions existing on the surface (α) of the resin layer of the pressure sensitive adhesive sheet of the present invention have irregular shapes.

In the present invention, the wording "the shapes of the one or more concave portions have irregular shapes" means that in a planar view or a stereoscopic view thereof, the shapes of the one or more concave portions do not have any specific shape such as a shape surrounded by a circle or a line alone (triangle, square, etc.) but have irregular shapes with no similarities between the shapes of the individual concave portions.

When the shapes of the one or more concave portions have irregular shapes, there can be provided a pressure sensitive adhesive sheet having well-balanced characteristics of air escape property, and pressure sensitive adhesion characteristics.

Like the pressure sensitive adhesive sheet described in PTL 1, a pressure sensitive adhesive sheet having a pressure sensitive adhesive layer with pre-designed determinate grooves formed on the surface thereof through embossed pattern transfer is known. In the pressure sensitive adhesive sheet of the type, the shapes of the grooves are determinate, and even though the shapes of the grooves are so planned as to improve at least one characteristic selected from air escape property, appearance, pressure sensitive adhesion characteristics and punching property, the other characteristics often worsen in many cases.

For example, the shapes of grooves capable of contributing toward improvement of air escape property differ from the shapes of grooves capable of contributing toward improvement of pressure sensitive adhesion characteristics, in point of the shapes of the grooves required for improving the individual characteristics.

Namely, in the pressure sensitive adhesive sheet of the present invention where the shapes of the one or more concave portions existing on the surface (α) of the resin layer have irregular shapes, there are formed one or more concave portions that differ in point of the contribution toward improvement of various characteristics of air escape property, appearance, pressure sensitive adhesion characteristics and punching property, and consequently, there can be provided a pressure sensitive adhesive sheet having well-balanced characteristics.

For the judgement whether or not the shapes of the concave portions on the surface (α) have irregular shapes, in principle, the shapes of the concave portions are observed three-dimensionally and visually or through a digital microscope or an electron microscope (magnification: 30 to 100). In a planar view from the side of the surface (α) of the concave portions, when the planar shape of the concave portion is identified to have an irregular shape, it may be considered that the "shapes of the one or more concave portions have irregular shapes".

However, when regions each surrounded by an arbitrarily selected square having an edge length of 1 to 10 mm on the surface (α) (preferably a region (P) surrounded by a square having an edge length of 5 mm) are selected and the shapes of the concave portions existing in each region are observed visually or with a digital microscope or an electron microscope (magnification: 30 to 100) in a planar view (if desired, in a stereoscopic view) from the side of the surface (α), and when the shapes of the concave portions existing in each of the selected regions are judged to have irregular shapes under the condition, it may also be considered that "the shapes of the concave portions existing on the surface (α) of the resin layer have irregular shapes".

In the case where the region (R) is larger than a photographable region with a digital microscope, plural images taken in the neighboring photographable regions are combined to be one image of the region (R), which may be used for the above judgement.

From the viewpoint of providing a pressure sensitive adhesive sheet having improved air escape property, it is desirable that the irregular shapes of the one or more concave portion can be visually recognized from the side of the exposed surface (α) of the resin layer. In the pressure sensitive adhesive sheet 2a or 2b where the release material 14a is further provided on the surface (α) 12a of the resin layer 12, as shown in FIG. 1(c) or FIG. 1(d), it is desirable that, when the release material 14a is peeled away, such irregular shapes of the one or more concave portions can be visually recognized from the side of the exposed surface (α) by observing with the naked eyes.

Preferably, the one or more concave portions are formed through self-formation of the resin layer.

In the present invention, "self-formation" means a phenomenon of naturally forming a disorganized profile in a process of self-sustaining formation of a resin layer, and more precisely, means a phenomenon that, in a step of drying the coating film formed of a composition that is a forming material for the resin layer, a disorganized profile is formed naturally along with the procedure of curing of the coating film.

The shapes of the one or more concave portions thus formed through self-formation of the resin layer in the manner as above may be controlled in some degree by controlling the drying condition or the kind and the content of the component in the composition that is a forming material for the resin layer, but differ from grooves to be formed through embossed pattern transfer, and it may be said that "it is substantially impossible to reproduce exactly the same shapes". Consequently, it may be said that the one or more concave portions formed through self-formation of the resin layer could have irregular shapes.

The process of forming one or more concave portions on the surface (α) of the resin layer that the pressure sensitive adhesive sheet of the present invention has is considered to be as follows.

First, during formation of a coating film of a composition that contains fine particles as a forming material for the particle part (Y), fine particles exist at random in the coating film.

Here, in the step of drying the coating film, contraction stress develops inside the coating film, and in the part where the bonding force of the resin would have attenuated owing to the presence of the fine particles therein, the coating film is cracked inside it. With that, it is considered that the resin around the cracked part may flow into the space temporarily formed by cracking to thereby form one or more concave portions on the surface (α) of the resin layer.

In addition, it is considered that, in the drying step for the coating film, when cracks are formed inside the coating film, the fine particles originally having existed therein would be pushed away into other parts, and therefore the proportion of the particle part (Y) in the sites where the one or more concave portions are formed would be smaller than in the other sites.

The one or more concave portions are easy to form, for example, by separately forming a coating film of a composition having a high content of fine particles and having a low content of resin, and a coating film of a composition containing a resin as a main component, and drying the two coating films simultaneously.

It is considered that, when two coating films that differ in the resin content are formed and then the two coating films are dried simultaneously, a contraction stress difference could be generated inside the coating films being dried, and the coating films could be thereby readily cracked.

From the viewpoint of readily forming the one or more concave portions, it is recommended to control the condition appropriately in consideration of the following matters. It is considered that these matters could react with each other in a complex form to facilitate the formation of the one or more concave portions. In this connection, preferred embodiments of the matters for facilitating the formation of the one or more concave portions are as described in the corresponding sections to be given hereinunder.

The kind, constituent monomers, molecular weight and content of the resin contained in the composition of the forming material for the coating film.

The kind of the crosslinking agent and the kind of the solvent contained in the composition of the forming material for the coating film.

The viscosity and the solid concentration of the composition of the forming material for the coating film.

The shape, kind and mass concentration of fine particles.

The dispersion state of the fine particles in the composition of the forming material for the coating film and in the coating film, and the content of the fine particles.

The thickness of the coating film to be formed (when plural layers are formed, the thickness of each coating film).

The drying temperature and the drying time for the formed coating film.

In formation of the pressure sensitive adhesive layer in an ordinary pressure sensitive adhesive sheet, it is intended to form the pressure sensitive adhesive layer having a flat surface, and the above-mentioned matters are suitably settled in many cases.

On the other hand, in the present invention, the above matters are so settled that the one or more concave portions capable of contributing toward improvement of the air escape property of the pressure sensitive adhesive sheet can be formed, quite differing from those in the planning method for the pressure sensitive adhesive layer of ordinary pressure sensitive adhesive sheets.

Preferably, the above-mentioned matters are suitably settled in consideration of the flowability of the fine particles and the resin contained in the coating film to be formed.

For example, by controlling the viscosity of the coating film formed of a composition containing a large amount of fine particles to fall within a suitable range, it is possible to suitably prevent the formed coating film from being mixed with any other coating film (a coating film containing a large amount of resin) while the predetermined flowability of the fine particles in the coating film could be maintained as such. By such controlling, cracks could be readily formed in the horizontal direction to facilitate formation of one or more concave portions in the coating film containing a large amount of resin.

As a result, it may be possible to increase the proportion of the one or more concave portions to be formed on the surface ($\alpha$) and to increase the proportion of the one or more concave portions connecting to each other, thereby giving a pressure sensitive adhesive sheet having a more superior air escape property.

Among the above-mentioned matters, it is desirable to suitably control the kind, the constituent monomers and the molecular weight of the resin and the resin content so that the resin contained in the coating film containing a large amount of resin could have a suitable viscoelasticity.

Namely, by suitably increasing the hardness of the coating film (the hardness thereof that may be determined various factors such as the viscoelasticity of resin, the viscosity of the coating liquid, etc.), the contract stress of the resin part (X) increases to facilitate the formation of one or more concave portions. When the hardness of the coating film is higher, the contraction stress could be higher to facilitate the formation of one or more concave portions, but when the coating film is too hard, the coatability thereof may worsen. In addition, when the resin elasticity is increased too much, the adhesive strength of the resin layer to be formed from the coating film tends to lower. In consideration of these, it is desirable to suitably control the viscoelasticity of the resin.

It is considered that, by suitably selecting the fine particles and the resin to thereby make the dispersion condition of the fine particles appropriate, the degree of swelling of the thickness of the resin layer owing to the fine particles therein and the self-forming power of the one or more concave portions could be thereby controlled and, as a result, the one or more concave portions could be readily formed on the surface ($\alpha$).

Further, in consideration of the crosslinking speed of the formed coating film (or the composition of the forming material), it is desirable that the above-mentioned matters are suitably settled.

Namely, in the case where the crosslinking speed of the coating film is too high, the coating film would be cured before formation of one or more concave portions therein. In addition, in the case, there may be some influences on the degree of cracking of the coating film.

The crosslinking speed of the coating film may be controlled by suitably defining the kind of the crosslinking agent and the kind of the solvent in the composition of the forming material or by suitably settling the drying time and the drying temperature for the coating film.

Preferably, in the pressure sensitive adhesive sheet of the present invention, plural concave portions 13 exist on the surface ($\alpha$) of the resin layer 12 on the side opposite to the side where the substrate 11 or the release material 14 is provided, as shown in FIG. 1(a) to Fig. (d). Also preferably, the pressure sensitive adhesive sheet of the present invention satisfies the following requirement (I) and/or (II).

Requirement (I): The concave portions have a maximum height difference of 0.5 μm or more.

Requirement (II): Plural concave portions exist on the surface ($\alpha$) of the resin layer, and 95% or more of the plural concave portions each have a different shape.

Requirements (I) and (II) will be described in more detail below.

<Requirement (I)>

FIG. 2 includes schematic cross-sectional views of a resin layer, showing examples of a shape on the side of the surface ($\alpha$) of the resin layer that the pressure sensitive adhesive sheet of the present invention has.

Like the concave portion 13 shown in FIG. 2(a), the shape of an ordinary concave portion has two mountain parts ($M_1$) and ($M_2$) and a valley part (N). The "height difference" of the concave portion in the present invention means the length of the difference (h) between the highest position (m) of the two mountain parts ($M_1$) and ($M_2$) (in FIG. 2(a), the maximum point of the mountain part ($M_1$)) and the lowest position (n) thereof (in FIG. 2(a), the minimum point of the valley part (N)), relative to the thickness direction of the resin layer 12.

It is considered that the case of FIG. 2(b) would have two concave portions of a concave portion 131 having two mountain parts ($M_{11}$) and ($M_{12}$) and a valley part ($N_1$), and a concave portion 132 having two mountain parts ($M_{12}$) and ($M_{13}$) and a valley part ($N_2$). In this case, the length of the difference ($h_1$) between the maximum point of the mountain part ($M_{11}$) and the minimum point of the valley part ($N_1$) indicates the height difference of the concave portion 131, and the length of the difference ($h_2$) between the maximum point of the mountain part ($M_{13}$) and the minimum point of the valley part ($N_2$) indicates the height difference of the concave portion 132.

The "concave portion" defined by the requirement (I) indicates a concave portion having a maximum height difference of 0.5 μm or more. The "concave portion" defined by the requirement (I) may be one having a site with a height difference of 0.5 ptm or more in any part of the concave portion, and the concave portion needs not to have the height difference in the entire region thereof.

Preferably, plural concave portions satisfying the requirement (I) exist on the surface.

Regarding the presence or absence of plural concave portions satisfying the requirement (I), the region (P) surrounded by an arbitrarily selected square having an edge length of 5 mm on the surface ($\alpha$) of the resin layer of the pressure sensitive adhesive sheet is observed with an electronic microscope for the judgment. More specifically, the presence or absence is judged according to the method described in the section of Examples.

The maximum height difference of one concave portion is 0.5 μm or more, but from the viewpoint of improving the air escape property of the pressure sensitive adhesive sheet, from the viewpoint of keeping the good appearance of the pressure sensitive adhesive sheet and from the viewpoint of the shape stability of the pressure sensitive adhesive sheet, the height difference is preferably 1.0 μm or more and up to the thickness of the resin layer, more preferably 3.0 μm or more and up to the thickness of the resin layer, and even more preferably 5.0 μm or more and up to the thickness of the resin layer.

The ratio of the maximum height difference of plural concave portions existing inside the region (P) to the thickness of the resin layer [maximum height difference/thickness of resin layer] is preferably 1/100 to 100/100, more preferably 5/100 to 99/100, even more preferably 10/100 to 96/100, still more preferably 15/100 to 90/100.

The mean value of the width of the concave portions is, from the viewpoint of improving the air escape property of the pressure sensitive adhesive sheet and from the viewpoint of bettering the pressure sensitive adhesiveness of the pressure sensitive adhesive sheet, preferably 1 to 500 Lm, more preferably 3 to 400 μm, even more preferably 5 to 300 μm.

In the present invention, the width of the concave portion means the distance between the maximum points of the two mountain parts, and in the concave portion 13 shown in FIG. 2(*a*), the width indicates the distance L between the mountain part ($M_1$) and the mountain part ($M_2$). In the concave portion 131 shown in FIG. 2(*b*), the width indicates the distance $L_1$ between the mountain part ($M_{11}$) and the mountain part ($M_{12}$), and in the concave portion 132 therein, the width indicates the distance $L_2$ between the mountain part ($M_{13}$) and the mountain part ($M_{12}$).

In a planar view of the pressure sensitive adhesive sheet of the present invention (when the sheet is viewed from directly above), when the concave portion has a long wide and a short side, the short side is the width.

The ratio of the maximum height difference of one concave portion to the mean value of the width [maximum height difference/mean value of width) (in the concave portion 13 shown in FIG. 2(*a*), the ratio is "h/L") is, from the viewpoint of improving the air escape property of the pressure sensitive adhesive sheet and from the viewpoint of bettering the pressure sensitive adhesiveness of the pressure sensitive adhesive sheet, preferably 1/500 to 100/1, more preferably 3/400 to 70/3, even more preferably 1/60 to 10/1.

<Requirement (II)>

Like the above-mentioned requirement (II), in the pressure sensitive adhesive sheet of the present invention, it is desirable that plural concave portions exist on the surface (α) of the resin layer and 95% or more of the plural concave portions have shapes that differ from each other.

Presence of plural concave portions that satisfy the requirement (II) on the surface (α) of the resin layer makes it possible to provide a pressure sensitive adhesive sheet having well-balanced characteristics of air escape property and pressure sensitive adhesion characteristics.

FIG. 3 is a schematic plan view of the surface (α), showing one example of the surface (α) of the resin layer that the pressure sensitive adhesive sheet of the present invention has. As shown in FIG. 3, in the pressure sensitive adhesive sheet of the present invention, the ratio of the concave portions each having a different shape is extremely large among the plural concave portions 13 existing on the surface (α) 12*a* of the resin layer 12. The pressure sensitive adhesive sheet of the present invention is clearly discriminated from a pressure sensitive adhesive sheet having grooves arranged in a predetermined pattern according to a previously planned configuration, such as that described in PTL 1. Namely, these concave portions 13 differ from grooves arranged in a previously-planned configuration like those formed using a release material that has an embossed pattern formed thereon.

Regarding a heretofore-known pressure sensitive adhesive sheet having, on the surface of the pressure sensitive adhesive layer thereof, grooves as arranged in a predetermined pattern in a preplanned shape, even when at least one characteristic thereof selected from the air escape property, the outward appearance, the pressure sensitive adhesion characteristics and the punching property is tried to be improved by the shape of the grooves and the arrangement of the grooves, the other characteristics of the sheet are worsened in many cases.

The present inventors have specifically noted that, for example, the shape of the grooves capable of contributing toward improving air escape property and the shape of the grooves capable of improving pressure sensitive adhesion characteristics differs from each other, and have found out the technical meaning of satisfying the requirement (II).

Namely, in the pressure sensitive adhesive sheet of the present invention, the plural concave portions having shapes differing from each other and existing inside the region (P) on the surface (α) of the resin layer differ from each other also in point of the contribution ratio of the air escape property, the outward appearance, the pressure sensitive adhesion characteristics and the punching property. Consequently, by forming such plural concave portions each having a different contribution ratio to those characteristics on the surface (α) of the resin layer, the characteristics of the resultant pressure sensitive adhesive sheet can be thereby well balanced.

In one embodiment of the pressure sensitive adhesive sheet of the present invention, the ratio of the plural concave portions having shapes differing from each other and existing inside the region (P) on the surface (α) of the resin layer is preferably 98% or more relative to the total number (100%) of the concave portions existing inside the region (P), more preferably 100%.

In the present invention, the matter whether or not the requirement (II) is satisfied may be judged as follows. The shapes of the plural concave portions existing inside the region (P) surrounded by a square having an edge length of 5 mm that is arbitrarily selected on the surface (α) of the resin layer of the targeted pressure sensitive adhesive sheet are observed with an electronic microscope (magnification: 30 to 100), and when the number of the concave portions having shapes differing from each other is 95% or more (preferably 98% or more, more preferably 100%) relative to the total number of the plural concave portions observed inside the region (P), it is judged that the observed sheet is a pressure sensitive adhesive sheet satisfying the above requirement (II) exist on the surface (α) thereof. For the observation of the shapes of the plural concave portions, a method of directly observing the sheet with an electronic microscope having the above-mentioned magnification may be employed, or a method of taking a picture of the sheet using an electronic microscope having the above-mentioned magnification, and visually observing the shapes of the plural concave portions shown on the image may also be employed. More specifically, the satisfaction of the requirement may be judged according to the method described in the section of Examples.

Here, "the number of the concave portions having shapes differing from each other is 100%" means that "all the plural concave portions observed inside the region (P) have shapes differing from each other".

In this description, the concave portions connected uninterruptedly to each other in a selected region are counted as "one concave portion". However, when two concave portions existing in a selected region bonds to one concave portion in the other region adjacent to that selected region to form one concave portion, the two concave portions in the selected region should be counted as independent ones.

From the viewpoint of providing a pressure sensitive adhesive sheet having well-balanced characteristics of air escape property, appearance, pressure sensitive adhesion characteristics, and punching property, it is desirable that the plural concave portions exist irregularly on the surface ($\alpha$) of the resin layer of one embodiment of the pressure sensitive adhesive sheet of the present invention.

In the present invention, the wording "plural concave portions exist irregularly" means that the positions of the plural concave portions do not have the same repeating pattern but are in an irregular (random) state (where the positions of the plural concave portions do not have periodicity). Namely, the state differs from a state where concave portions are "arranged" based on a specific regularity, like the grooves described in PTL 1, that is, the grooves formed through embossed pattern transfer of pressing an embossed pattern-having release material against the surface of a resin layer.

As plural concave portions exist irregularly therein, there can be provided a pressure sensitive adhesive sheet having well-balanced characteristics of air escape property, and pressure sensitive adhesion characteristics.

For judgement whether or not "plural concave portions exist irregularly", in principle, the positions of the plural concave portions existing on the surface ($\alpha$) of the resin layer of the targeted pressure sensitive adhesive sheet are identified through visual observation thereof or through observation thereof with a digital microscope or an electron microscope (magnification: 30 to 100).

However, for the judgement, a region surrounded by a square of 1 to 10 mm on a side (preferably a region (P) surrounded by a square having an edge length of 5 mm) is arbitrarily selected on the surface ($\alpha$), and the plural concave portions existing in the region are observed with a digital microscope or an electron microscope (magnification: 30 to 100), thereby checking for the presence or absence of any specific regularity in the positions where the concave portions are formed.

For observation of the positions where the plural concave portions are formed, a method of direct observation of the concave portions with an electron microscope at the magnification as mentioned above may be employed, or a method of taking an image thereof with an electron microscope having the above-mentioned magnification, followed by visually observing the positions of the plural concave portions shown in the image may also be employed.

Preferably, one embodiment of the pressure sensitive adhesive sheet of the present invention has one or more concave portions existing in a region (Q) surrounded by an arbitrarily selected square having an edge length of 1 mm on the surface ($\alpha$) of the resin layer 12 therein.

Presence of one or more concave portions in the region (Q) on the surface ($\alpha$) makes it possible to provide a pressure sensitive adhesive sheet having well-balanced characteristics of air escape property and pressure sensitive adhesion characteristics.

In the present invention, the number of the concave portions existing in the region (Q) on the surface ($\alpha$) is preferably 1 or more, but from the above-mentioned viewpoints, the number is more preferably 2 or more, even more preferably 3 or more, and on the other hand, from the viewpoint of keeping good appearance and pressure sensitive adhesion characteristics, the number of preferably 1000 or less, more preferably 500 or less.

From the viewpoint of improving the air escape property of the pressure sensitive adhesive sheet, it is desirable that one or more concave portions existing in the region (Q) on the surface ($\alpha$) of the resin layer of one embodiment of the pressure sensitive adhesive sheet of the present invention extend toward any side of a square having an edge length of 1 mm, which is a boundary line of the region (Q).

The number of the cross lines at which the concave portion extends to cross any side of the square having an edge length of 1 mm, which is a boundary line of between the concave portion and the region (Q) is preferably one or more, more preferably 2 or more, even more preferably 3 or more.

From the viewpoint of providing a pressure sensitive adhesive sheet having more improved air escape property, one or more concave portions existing in the region (Q) on the surface ($\alpha$) of the resin layer that one embodiment of the pressure sensitive adhesive sheet of the present invention has preferably have a shape that continuously extends into the other one or more regions (Q') surrounded by a square having an edge length of 1 mm, which are adjacent to the region (Q), more preferably have a shape that continuously extends into the other two or more regions (Q'), and even more preferably have a shape that continuously extends into the other three or more regions (Q'), In addition, it is desirable that the concave portions existing in the region (Q) on the surface ($\alpha$) of the resin layer have a shape extending not only into one or more other region (Q') adjacent to the region (Q) but also further continuously into any other regions (Q") than the region (Q), which are adjacent to the other region (Q').

In the following, each constitution of the pressure sensitive adhesive sheet of the present invention will be described.

Substrate

The substrate used in one embodiment of the present invention is not particularly limited, and examples thereof include a paper substrate, a resin film or sheet, and a substrate containing a paper substrate laminated with a resin, which may be appropriately selected depending on the purpose of the pressure sensitive adhesive sheet according to one embodiment of the present invention.

Examples of paper constituting the paper substrate include thin paper, medium quality paper, wood-free paper, impregnated paper, coated paper, art paper, parchment paper, and glassine paper.

Examples of the resin constituting the resin film or sheet include a polyolefin resin, such as polyethylene and polypropylene; a vinyl resin, such as polyvinyl chloride, polyvinylidene chloride, polyvinyl alcohol, an ethylene-vinyl acetate copolymer, and an ethylene-vinyl alcohol copolymer; a polyester resin, such as polyethylene terephthalate, polybutylene terephthalate, and polyethylene naphthalate; polystyrene; an acrylonitrile-butadiene-styrene copolymer; cellulose triacetate; polycarbonate; a urethane resin, such as polyurethane and acrylic-modified polyurethane; polymethylpentene; polysulfone; polyether ether ketone; polyether sulfone; polyphenylenesulfide; a polyimide resin, such as polyether imide and polyimdie; a polyamide resin; an acrylic resin; and a fluorine resin.

Examples of the substrate containing a paper substrate laminated with a resin include laminated paper containing the aforementioned paper substrate laminated with a thermoplastic resin, such as polyethylene.

Among these substrates, a resin film or sheet is preferred, a film or sheet formed of a polyester resin is more preferred, and a film or sheet formed of polyethylene terephthalate (PET) is further preferred.

In the case where the pressure sensitive adhesive sheet of the present invention is applied to a purpose that requires heat resistance, a film or sheet constituted by a resin selected from polyethylene naphthalate and a polyimide resin is preferred, and in the case where the pressure sensitive adhesive sheet is applied to a purpose that requires weather resistance, a film or sheet constituted by a resin selected from polyvinyl chloride, polyvinylidene chloride, an acrylic resin, and a fluorine resin is preferred.

The thickness of the substrate may be appropriately determined depending on the purpose of the pressure sensitive adhesive sheet of the present invention, and is preferably from 5 to 1,000 μm, more preferably from 10 to 500 lpm, further preferably from 12 to 250 μm, and still further preferably from 15 to 150 μm, from the standpoint of the handleability and the economic efficiency.

The substrate may further contain various additives, such as an ultraviolet ray absorbent, a light stabilizer, an antioxidant, an antistatic agent, a slipping agent, an antiblocking agent, and a colorant.

The substrate used in one embodiment of the present invention is preferably a non-air permeable substrate from the standpoint of enhancing the blister resistance of the resulting pressure sensitive adhesive sheet, and specifically a substrate containing the aforementioned resin film or sheet having a metal layer on the surface thereof.

Examples of the metal forming the metal layer include a metal having metallic luster, such as aluminum, tin, chromium, and titanium.

Examples of the method of forming the metal layer include a method of vapor-depositing the metal by a PVD method, such as vacuum vapor deposition, sputtering, and ion plating, and a method of attaching a metal foil formed of the metal with an ordinary pressure sensitive adhesive, and a method of vapor-depositing the metal by a PVD method is preferred.

In the case where a resin film or sheet is used as the substrate, the surface of the resin film or sheet may be subjected to a surface treatment by an oxidizing method, a roughening method, and the like, or may be subjected to a primer treatment, from the standpoint of enhancing the adhesion to the resin layer to be laminated on the resin film or sheet.

Examples of the oxidizing method include a corona discharge treatment, a plasma discharge treatment, a chromic acid treatment (wet process), a hot air treatment, and an ozone treatment, and an ultraviolet ray irradiation treatment, and examples of the roughening treatment include a sand blasting treatment and a solvent treatment.

Release Material

The release material used in one embodiment of the present invention may be a release sheet having both surfaces subjected to a release treatment, and a release sheet having one surface subjected to a release treatment, and examples thereof include a substrate for the release material having coated thereon a release agent. The release treatment is preferably performed on a flat release material without a relief shape formed thereon (for example, a release material having no emboss pattern formed thereon).

Examples of the substrate for the release material include the paper substrate, the resin film or sheet, and the substrate containing a paper substrate laminated with a resin described above used as the substrate of the pressure sensitive adhesive sheet according to one embodiment of the present invention.

Examples of the release agent include a rubber elastomer, such as a silicone resin, an olefin resin, an isoprene resin, and a butadiene resin, a long-chain alkyl resin, an alkyd resin, and a fluorine resin.

The thickness of the release material is not particularly limited, and is preferably from 10 to 200 μm, more preferably from 25 to 170 μm, and further preferably from 35 to 80 μm.

[Resin Layer]

The resin layer that the pressure sensitive adhesive sheet of the present invention has contains a resin part (X) containing a resin as a main component and a particle part (Y) consisting of fine particles.

In the pressure sensitive adhesive sheet of the present invention, at least the surface ($\alpha$) of the resin layer on the side opposite to the side on which at least substrate or a release material is provided has pressure sensitive adhesiveness, but the surface ($\beta$) of the resin layer on the side on which a substrate or a release material is provided may also has pressure sensitive adhesiveness.

Preferably, the resin layer that one embodiment of the pressure sensitive adhesive sheet of the present invention additionally has a void part (Z) in addition to the resin part (X) and the particle part (Y). The void part (Z), if any, in the resin layer can improve the blister resistance of the pressure sensitive adhesive sheet.

The void part (Z) includes the voids existing between the fine particles and, when the fine particles are secondary particles, the voids existing inside the secondary particles.

In the case where the resin layer has a multilayer structure, even though a void part (Z) exists in the process of forming the resin layer or just after formation of the layer, the resin part (X) may flow into the void part (Z) and therefore the voids may disappear to give a resin layer not having the void part (Z).

However, even in the case where a void part (Z) having existed in the resin layer for a period of time has disappeared, the resin layer that one embodiment of the pressure sensitive adhesive sheet of the present invention has may have one or more concave portions on the surface ($\alpha$) and can be therefore excellent in air escape property and blister resistance.

The shear storage elastic modulus at 100° C. of the resin layer that one embodiment of the pressure sensitive adhesive sheet of the present invention has is, from the viewpoint of improving the air escape property and the blister resistance of the pressure sensitive adhesive sheet, preferably $9.0 \times 10^3$ Pa or more, more preferably $1.0 \times 10^4$ Pa, even more preferably $2.0 \times 10^4$ Pa or more.

In the present invention, the shear storage elastic modulus at 100° C. of the resin layer means a value measured with a viscoelastometer (for example, apparatus name "DYNAMIC ANALYZER RDA II" manufactured by Rheometrics Inc.) at a frequency of 1 Hz.

The thickness of the resin layer is preferably 1 to 300 μm, more preferably 5 to 150 μm, even more preferably 10 to 75 μm.

The thickness of the resin layer may be measured by observing the cross section of the resin layer of the targeted pressure sensitive adhesive sheet, using an electron microscope, or may be measured according to the method described in JIS K 7130.

The adhesive strength of the surface ($\alpha$) of the resin layer of one embodiment of the pressure sensitive adhesive sheet of the present invention is preferably 0.5 N/25 mm or more, more preferably 2.0 N/25 mm or more, even more preferably 3.0 N/25 mm or more, further more preferably 4.0 N/25 mm or more, still further more preferably 7.0 N/25 mm or more.

In the case where the surface (β) of the resin layer also has pressure sensitive adhesiveness, the adhesive strength of the surface (β) preferably belongs to the above-mentioned range.

The value of the adhesive strength of the pressure sensitive adhesive sheet means a value measured according to the method described in the section of Examples.

<Resin Part (X)>

The resin part (X) constituting the resin layer contains a resin as a main component.

In the present invention, the resin part (X) is a part containing any other component than fine particles contained in the resin layer, and in this point, this is differentiated from the particle part (Y).

The resin part (X) contains a resin as a main component and may contain a crosslinking agent and ordinary additives in addition to resin.

The content of the resin in the resin part (X) is generally 40% by mass or more, and is preferably 50% by mass or more, more preferably 65% by mass or more, even more preferably 75% by mass or more, still more preferably 85% by mass or more, further more preferably 90% by mass or more, relative to the total amount (100% by mass) of the resin part (X), and is preferably 100% by mass or less, more preferably 99.9% by mass or less, relative to the total amount (100% by mass) of the resin part (X).

In the present invention, a value of the content of the resin in the resin composition to be the forming material for the resin part (X) may be considered to be the above-mentioned "content of the resin in the resin part (X)".

The resin to be contained in the resin part (X) is preferably a pressure sensitive adhesive resin from the viewpoint of making the surface (α) of the resin layer to be formed express pressure sensitive adhesiveness.

In particular, in the case where the resin layer has a multilayer structure formed by laminating a layer (Xβ), a layer (Y1) and a layer (Xα) in this order from the side on which a substrate or a release material is provided, like in the pressure sensitive adhesive sheet 1a of FIG. 1(a), it is desirable from the above-mentioned viewpoints that at least the layer (Xα) contains a pressure sensitive adhesive resin.

Examples of the pressure sensitive adhesive resin include acrylic resins, urethane resins, rubber resins, silicone resins, etc.

Among these pressure sensitive adhesive resins, an acrylic resin is preferably contained from the viewpoint that the pressure sensitive adhesion characteristics and the weather resistance thereof are good and that the plural one or more concave portions satisfying the requirements (1) and (2), namely, the requirements (I) and (II), are easy to form on the surface (α) of the resin layer to be formed.

The content of the acrylic resin is preferably 25 to 100% by mass, and is more preferably 50 to 100% by mass, even more preferably 70 to 100% by mass, still more preferably 80 to 100% by mass, further more preferably 100% by mass, relative to the total amount (100% by mass) of the resin contained in the resin part (X).

From the viewpoint that the plural one or more concave portions satisfying the requirements (1) and (2), namely, the requirements (I) and (II) are easy to form on the surface (α) of the resin layer to be formed, it is desirable that the resin part (X) contains a resin having a functional group, more preferably an acrylic resin having a functional group.

In particular, in the case where the resin layer has a multilayer structure formed by laminating a layer (Xβ), a layer (Y1) and a layer (Xα) in this order from the side on which a substrate or a release material is provided, like in the pressure sensitive adhesive sheet 1a of FIG. 1(a), it is desirable from the above-mentioned viewpoints that at least the layer (Y1) contains a resin having a functional group.

The functional group is a group to be a crosslinking start point with a crosslinking agent, and examples thereof include a hydroxy group, a carboxy group, an epoxy group, an amino group, a cyano group, a keto group, an alkoxysilyl group, etc., but a carboxyl group is preferred.

In the case where the resin composition, which is a forming material for the resin part (X), contains a resin having the above-mentioned functional group, it is desirable that the resin composition further contains a crosslinking agent. In particular, in the case where the resin layer has the above-mentioned multilayer structure, it is desirable that at least the composition (y), which is a forming material for the layer (Y1), contains a crosslinking agent along with the functional group-having resin.

Examples of the crosslinking agent include an isocyanate crosslinking agent, an epoxy crosslinking agent, an aziridine crosslinking agent and a metal chelate crosslinking agent.

Examples of the isocyanate crosslinking agent include aromatic polyisocyanates such as tolylene diisocyanate, diphenylmethane diisocyanate, xylylene diisocyanate, etc.; aliphatic polyisocyanates such as hexamethylene diisocyanate, etc.; alicyclic polyisocyanates such as isophorone diisocyanate, hydrogenated diphenylmethane diisocyanate, etc.; biuret forms and isocyanurate forms of these compounds, and adduct forms that are reaction products with a low-molecular active hydrogen-containing compounds (ethylene glycol, propylene glycol, neopentyl glycol, trimethylolpropane, castor oil, etc.); etc.

Examples of the epoxy crosslinking agent include ethylene glycol glycidyl ether, 1,3-bis(N,N-diglycidylaminomethyl)cyclohexane, N,N,N',N'-tetraglycidyl-m-xylylenediamine, 1,6-hexanediol diglycidyl ether, trimethylolpropane diglycidyl ether, diglycidylaniline, diglycidylamine, etc.

Examples of the aziridine crosslinking agent include diphenylmethane-4,4'-bis(1-aziridinecarboxamide), trimethylolpropane-tri-β-aziridinylpropionate, tetramethylolmethane tri-β-aziridinylpropionate, toluene-2,4-bis(1-aziridinecarboxamide), triethylenemelamine, bisisophthaloyl-1-(2-methylaziridine), tris-1-(2-methylaziridine) phosphine, trimethylolpropane tri-β-(2-methylaziridine)propionate, etc.

The metal chelate crosslinking agent includes chelate compounds where the metal atom is aluminium, zirconium, titanium, zinc, iron, tin or the like. From the viewpoint that the plural concave portions satisfying the requirements (1) and (2), namely, the requirements (I) and (II) are easy to form, an aluminium chelate crosslinking agent is preferred.

Examples of the aluminium chelate crosslinking agent include diisopropoxyaluminium monooleyl acetacetate, monoisopropoxyaluminium bisoleyl acetacetate, monoisopropoxyaluminium monooleate monoethylacetacetate, diisopropoxyaluminium monolauroyl acetacetate, diisopropoxyaluminium monostearyl acetacetate, diisopropoxyaluminium monoisostearyl acetacetate, etc.

One alone or two or more of these crosslinking agents may be used either singly or as combined.

Among these, from the viewpoint that the plural concave portions satisfying the requirements (1) and (2), namely, the requirements (I) and (II) are easy to form on the surface (α) of the resin layer to be formed, it is desirable that the resin part (X) contains one or more selected from a metal chelate crosslinking agent, an epoxy crosslinking agent and an aziridine crosslinking agent, more preferably contains a metal chelate crosslinking agent, and even more preferably contains an aluminium chelate crosslinking agent.

The content of the crosslinking agent is preferably 0.01 to 15 parts by mass, and is more preferably 0.1 to 10 parts by mass, even more preferably 0.3 to 7.0 parts by mass, relative to 100 parts by mass of the resin having a functional group.

From the viewpoint of bettering the shape retentive force of the plural concave portions on the surface (α) of the resin layer, it is desirable that the resin part (X) contains both a metal chelate crosslinking agent and an epoxy crosslinking agent.

In the case where the resin part (X) contains both a metal chelate crosslinking agent and an epoxy crosslinking agent, the content ratio of the metal chelate crosslinking agent to the epoxy crosslinking agent [metal chelate crosslinking agent/epoxy crosslinking agent] is, from the above-mentioned viewpoints, preferably 10/90 to 99.5/0.5, more preferably 50/50 to 99.0/1.0, even more preferably 65/35 to 98.5/1.5, further more preferably 75/25 to 98.0/2.0.

The resin composition which is a material for forming the resin part (X) may contain any ordinary additive.

Examples of the ordinary additive include a tackifier, an antioxidant, a softener (plasticizer), a rust inhibitor, a pigment, a dye, a retardant, a reaction accelerator, a UV absorbent, etc.

One alone or two or more of these ordinary additives may be used either singly or as combined.

In the case where these ordinary additives are contained, the content of each ordinary additive is preferably 0.0001 to 60 parts by mass, and is more preferably 0.001 to 50 parts by mass, relative to 100 parts by mass of the resin.

One alone or two or more resins may be contained in the resin part (X) either singly or as combined.

The forming material for the resin part (X) of the resin layer that the pressure sensitive adhesive sheet of the present invention has is preferably a pressure sensitive adhesive containing a pressure sensitive adhesive resin having a functional group, more preferably an acrylic pressure sensitive adhesive containing an acrylic resin (A) having a functional group (hereinafter this may be simply referred to as "acrylic resin (A)"), and even more preferably an acrylic pressure sensitive adhesive containing a functional group-having acrylic resin (A) and a crosslinking agent (B).

The acrylic pressure sensitive adhesive may be any of a solvent-type one or an emulsion-type one.

The acrylic pressure sensitive adhesive favorable for the forming material for the resin part (X) is described below.

Examples of the acrylic resin (A) contained in the acrylic pressure sensitive adhesive include a polymer having a structural unit derived from an alkyl (meth)acrylate having a linear or branched alkyl group, a polymer having a structural unit derived from a (meth)acrylate having a cyclic structure, etc.

The mass-average molecular weight (Mw) of the acrylic resin (A) is preferably 50,000 to 1,500,000, more preferably 150,000 to 1,300,000, even more preferably 250,000 to 1,100,000, still more preferably 350,000 to 900,000.

Preferably, the acrylic resin (A) contains an acrylic copolymer (A1) having a structural unit (a1) derived from an alkyl (meth)acrylate (a1') having an alkyl group with 1 to 18 carbon atoms (hereinafter this may be referred to as "monomer (a1')"), and a structural unit (a2) derived from a functional group-containing monomer (a2') (hereinafter this may be referred to as "monomer (a2')"), and more preferably contains an acrylic copolymer (A1).

The content of the acrylic copolymer (A1) is preferably 50 to 100% by mass, and is more preferably 70 to 100% by mass, even more preferably 80 to 100% by mass, further more preferably 90 to 100% by mass, relative to the total amount (100% by mass) of the acrylic resin (A) in the acrylic pressure sensitive adhesive.

The copolymerization morphology of the acrylic copolymer (A1) is not specifically limited, and the copolymer may be any of a block copolymer, a random copolymer or a graft copolymer.

The carbon number of the alkyl group that the monomer (a1') has is, from the viewpoint of improving pressure sensitive adhesion characteristics, more preferably 4 to 12, even more preferably 4 to 8, further more preferably 4 to 6.

Examples of the monomer (a1') include methyl (meth)acrylate, ethyl (meth)acrylate, propyl (meth)acrylate, butyl (meth)acrylate, 2-ethylhexyl (meth)acrylate, lauryl (meth)acrylate, tridecyl (meth)acrylate, stearyl (meth)acrylate, etc.

Among these, butyl (meth)acrylate and 2-ethylhexyl (meth)acrylate are preferred, and butyl (meth)acrylate is more preferred.

The content of the structural unit (a1) is preferably 50 to 99.5% by mass, and is more preferably 60 to 99% by mass, even more preferably 70 to 95% by mass, still more preferably 80 to 93% by mass, relative to all the structural units (100% by mass) of the acrylic copolymer (A1).

Examples of the monomer (a2') include a hydroxy group-containing monomer, a carboxy group-containing monomer, an epoxy group-containing monomer, an amino group-containing monomer, a cyano group-containing monomer, a keto group-containing monomer, an alkoxysilyl group-containing monomer, etc.

Among these, a carboxy group-containing monomer is more preferred.

The carboxy group-containing monomer includes (meth)acrylic acid, maleic acid, fumaric acid, itaconic acid, etc., and (meth)acrylic acid is preferred.

The content of the structural unit (a2) is preferably 0.5 to 50% by mass, and is more preferably 1 to 40% by mass, even more preferably 5 to 30% by mass, still more preferably 7 to 20% by mass, relative to all the structural units (100% by mass) of the acrylic copolymer (A1).

The acrylic copolymer (A1) may have a structural unit (a3) derived from any other monomer (a3') than the above-mentioned monomers (a1') and (a2').

Examples of the other monomer (a3') include (meth)acrylates having a cyclic structure such as cyclohexyl (meth)acrylate, benzyl (meth)acrylate, isobornyl (meth)acrylate, dicyclopentanyl (meth)acrylate, dicyclopentenyl (meth)acrylate, dicyclopentanyloxyethyl (meth)acrylate, imido (meth)acrylate, etc., vinyl acetate, acrylonitrile, styrene, etc.

The content of the structural unit (a3) is preferably 0 to 30% by mass, and is more preferably 0 to 20% by mass, even more preferably 0 to 10% by mass, still more preferably 0 to 5% by mass, relative to all the structural units (100% by mass) of the acrylic copolymer (A1).

One alone or two or more of the above-mentioned monomers (a1') to (a3') may be used either singly or as combined.

A method for synthesis of the acrylic copolymer (A1) component is not specifically limited. For example, the copolymer may be produced according to a method including dissolving starting monomers in a solvent and polymerizing them in a mode of solution polymerization in the presence of a polymerization initiator, a chain transfer agent and the like, or a method of emulsion polymerization in an aqueous system using starting monomers in the presence of an emulsifier, a polymerization initiator, a chain transfer agent, a dispersant, etc.

The crosslinking agent (B) to be contained in the acrylic pressure sensitive adhesive includes those mentioned hereinabove, but from the viewpoint of bettering pressure sensitive adhesive characteristics and from the viewpoint of facilitating the formation of the plural concave portions satisfying the requirements (1) and (2), namely, the requirements (I) and (II) on the surface (α) of the resin layer to be formed, at least one or more selected from a metal chelate crosslinking agent and an epoxy crosslinking agent are preferably contained, more preferably a metal chelate crosslinking agent is contained, and even more preferably an aluminium chelate crosslinking agent is contained.

From the viewpoint of bettering the shape retentivity of plural concave portions on the surface (α) of the resin layer, the crosslinking agent (B) preferably contains both a metal chelate crosslinking agent and an epoxy crosslinking agent.

The content of the crosslinking agent (B) is preferably 0.01 to 15 parts by mass, and is more preferably 0.1 to 10 parts by mass, even more preferably 0.3 to 7.0 parts by mass, relative to 100 parts by mass of the acrylic resin (A) in the acrylic pressure sensitive adhesive.

In the case where a metal chelate crosslinking agent and an epoxy crosslinking agents are used as combined, the content ratio of the metal chelate crosslinking agent to the epoxy crosslinking agent [metal chelate crosslinking agent/epoxy crosslinking agent] is preferably 10/90 to 99.5/0.5, more preferably 50/50 to 99.0/1.0, even more preferably 65/35 to 98.5/1.5, further more preferably 75/25 to 98.0/2.0.

The acrylic pressure sensitive adhesive to be used in one embodiment of the present invention may contain any ordinary additive within a range not detracting from the advantageous effects of the present invention. The general additive includes those mentioned hereinabove, and the content of the ordinary additive is also as mentioned above.

The acrylic pressure sensitive adhesive to be used in one embodiment of the present invention may contain any other pressure sensitive adhesive resin than the acrylic resin (A) (for example, urethane resin, rubber resin, silicone resin, etc.) within a range not detracting from the advantageous effects of the present invention.

The content of the acrylic resin (A) in the acrylic pressure sensitive adhesive is preferably 50 to 100% by mass, and is more preferably 70 to 100% by mass, even more preferably 80 to 100% by mass, still more preferably 100% by mass, relative to the total amount (100% by mass) of the pressure sensitive adhesive resin contained in the acrylic pressure sensitive adhesive.

<Particle Part (Y)>

The particle part (Y) constituting the resin layer contains fine particles.

The mean particle size of the fine particles is, from the viewpoint of improving the air escape property and the blister resistance of the pressure sensitive adhesive sheet and from the viewpoint of facilitating the formation of the plural one or more concave portions satisfying the requirements (1) and (2), namely, the requirements (I) and (II) on the surface (α) of the resin layer to be formed, preferably 0.01 to 100 Lm, more preferably 0.05 to 25 μm, even more preferably 0.1 to 10 μm.

Preferably, the volume-average secondary particle diameter of the fine particles constituting the particle part (Y) is 1 to 70% of the thickness of the resin layer. When the volume-average secondary particle diameter of the fine particles is defined to be 1% or more of the thickness of the resin layer, the fine particles can be suitably arranged in the resin layer to provide a partial difference in the cohesive strength of the resin layer, whereby the resin layer can be readily cleaved in the drying step to facilitate self-formation of concave portions therein. When the volume-average secondary particle diameter of the fine particles is defined to be 70% or less of the thickness of the resin layer, the particles could hardly be exposed out of the surface of the resin layer and therefore the cohesive strength can be prevented from lowering. The volume-average secondary particle diameter of the fine particles is preferably 2 to 50% of the thickness of the resin layer, more preferably 3 to 30%, even more preferably 4 to 20%, and still more preferably 5 to 15%.

The value of the volume-average secondary particle diameter of the fine particles can be determined by measuring the particle size distribution according to a Coulter counter method using Multisizer III Coulter Counter, etc. The thickness of the resin layer may be measured according to JIS K7130:1999, using a constant-pressure thickness gauge (trade name "PG-02" manufactured by TECLOCK Corporation).

The fine particles to be used in one embodiment of the present invention are not specifically limited, including inorganic particles such as silica particles, metal oxide particles, barium sulfate, calcium carbonate, magnesium carbonate, glass beads, smectite and the like, and organic particles such as acrylic beads, etc.

Among these fine particles, one or more kinds selected from silica particles, metal oxide particles and smectite are preferred, and silica particles are more preferred.

The silica particles that are used in one embodiment of the present invention may be any ones of dry-method silica and wet-method silica.

The silica particles that are used in one embodiment of the present invention may also be an organic-modified silica that has been surface-modified with an organic compound having a reactive functional group or the like, an inorganic-modified silica that has been surface-treated with an inorganic compound such as sodium aluminate, sodium hydroxide or the like, as well as an organic/inorganic-modified silica that has been surface-treated with any of these organic compounds and inorganic compounds, or an organic/inorganic-modified silica that has been surface-treated with an organic/inorganic hybrid material of a silane coupling agent, etc.

These silica particles may be in the form of a mixture of two or more kinds.

The mass concentration of silica in the silica particles is preferably 70 to 100% by mass, and is more preferably 85 to 100% by mass, even more preferably 90 to 100% by mass, relative to the total amount (100% by mass) of the silica particles.

The volume-average secondary particle diameter of the silica particles that are used in one embodiment of the present invention is, from the viewpoint of improving the air escape property and the blister resistance of the pressure sensitive adhesive sheet, and from the viewpoint of facilitating the formation of the plural concave portions satisfying the requirements (1) and (2), namely, the requirements (I) and (II) on the surface (α) of the resin layer to be formed, preferably 0.5 to 10 μm, more preferably 1 to 8 μm, even more preferably 1.5 to 5 μm.

In the present invention, the value of the volume-average secondary particle diameter of the silica particles is a value determined through measurement of particle size distribution according to a Coulter counter method using Multisizer III or the like.

Examples of the metal oxide particles include particles of a metal oxide selected from titanium oxide, alumina, boehmite, chromium oxide, nickel oxide, copper oxide, titanium oxide, zirconium oxide, indium oxide, zinc oxide, and composite oxides thereof, etc., and include sol particles of those metal oxides.

Examples of smectite include montmorillonite, beidellite, hectorite, saponite, stevensite, nontronite, sauconite, etc.

Preferably, the fine particles constituting the particle part (Y) are not exposed out on the surface ($\alpha$). When the fine particles are not exposed out, the pressure sensitive adhesive sheet can have good pressure sensitive adhesion characteristics without injuring the adherend adhered thereto, and can have a good appearance. Here, the wording "fine particles are not exposed out" means as follows. Using, for example, a scanning electron microscope (trade name "S-4700" manufactured by Hitachi Limited), the surface of a targeted sample is observed, and using an energy dispersion X-ray analyzer (trade name "INCA Energy", Type: E2H, manufactured by Oxford Instruments Corporation), a region surrounded by an arbitrarily selected square having an edge length of 1 mm on the surface ($\alpha$) of the resin layer is irradiated with X-ray to detect the atoms existing therein. In the case where the proportion of the atoms derived from fine particles (for example, silicon atoms in silica fine particles) on the surface ($\alpha$) to the carbon atoms derived from the resin component (fine particles-derived atoms/carbon atoms) is 0.01 or less, absence of exposed fine particles is confirmed.

The mass retention rate after heating the resin layer that one embodiment of the pressure sensitive adhesive sheet of the present invention has, at 800° C. for 30 minutes is preferably 3 to 90% by mass, more preferably 5 to 80% by mass, even more preferably 7 to 70% by mass, still more preferably 9 to 60% by mass.

The mass retention rate can be considered to indicate the content (% by mass) of the fine particles contained in the resin layer.

When the mass retention rate is 3% by mass or more, the pressure sensitive adhesive sheet can be excellent in air escape property and blister resistance. In addition, in the production of the pressure sensitive adhesive sheet of the present invention, the plural concave portions satisfying the requirements (1) and (2), namely, the requirements (I) and (II) can be readily formed on the surface ($\alpha$) of the resin layer to be formed. On the other hand, when the mass retention rate is 90% by mass or less, a pressure sensitive adhesive sheet can be provided in which the film strength of the resin layer is high and which is excellent in water resistance and chemical resistance.

[Production Method for Pressure Sensitive Adhesive Sheet]

A production method for the pressure sensitive adhesive sheet of the present invention is described below.

The production method for the pressure sensitive adhesive sheet of the present invention is not specifically limited, but from the viewpoint of productivity and from the viewpoint of facilitating the formation of the plural concave portions satisfying the requirements (1) and (2), namely, the requirements (I) and (II) on the surface ($\alpha$) of the resin layer to be formed, a method having at least the following steps (1) and (2) is preferred.

Step (1): a step of forming a coating film (x') of a composition (x) containing the resin as a main component, and a coating film (y') of a composition (y) containing the fine particles in an amount of 15% by mass or more Step (2): a step of drying the plural coating films (the coating film (x') and the coating film (y')) formed in the step (1) simultaneously <Step (1)>

The step (1) is a step of forming a coating film (x') of a composition (x) containing the resin as a main component, and a coating film (y') of a composition (y) containing the fine particles in an amount of 15% by mass or more.

The composition (x) is a forming material for the resin part (X), and preferably contains a crosslinking agent along with the above-mentioned resin, and may further contain the above-mentioned ordinary additive.

The composition (y) is a forming material for the particle part (Y), and may contain a resin and a crosslinking agent, as well as the above-mentioned ordinary additive. The composition (y) containing those components of resin and others could also be a forming material for the resin part (X).

(Composition (x))

The resin contained in the composition (x) includes a resin that constitutes the above-mentioned resin part (X), and is preferably a pressure sensitive adhesive resin having a functional group, more preferably the above-mentioned functional group-having acrylic resin (A), and is preferably the above-mentioned acrylic copolymer (A1).

The content of the resin in the composition (x) is generally 40% by mass or more, and is preferably 50% by mass or more, more preferably 65% by mass or more, even more preferably 75% by mass or more, still more preferably 85% by mass or more, further more preferably 90% by mass or more, relative to the total amount (100% by mass (but excluding diluent solvent)) of the composition (x), and is preferably 100% by mass or less, more preferably 95% by mass or less, relative to the total amount (100% by mass (but excluding diluent solvent)) of the composition (x).

The crosslinking agent contained in the composition (x) includes the crosslinking agent contained in the above-mentioned resin part (X). Preferably, one or more selected from a metal chelate crosslinking agent and an epoxy crosslinking agent are contained, and more preferably a metal chelate crosslinking agent is contained.

Further, from the viewpoint of bettering the shape retentivity of the plural concave portions on the surface ($\alpha$) of the resin layer to be formed, it is desirable that the composition (x) contains both a metal chelate crosslinking agent and an epoxy crosslinking agent.

In the case where the composition (x) contains both a metal chelate crosslinking agent and an epoxy crosslinking agent, the content ratio of the metal chelate crosslinking agent to the epoxy crosslinking agent [metal chelate crosslinking agent/epoxy crosslinking agent] is preferably 10/90 to 99.5/0.5, more preferably 50/50 to 99.0/1.0, even more preferably 65/35 to 98.5/1.5, still more preferably 75/25 to 98.0/2.0.

The content of the crosslinking agent is preferably 0.01 to 15 parts by mass, and is more preferably 0.1 to 10 parts by mass, even more preferably 0.3 to 7.0 parts by mass, relative to 100 parts by mass of the resin contained in the composition (x).

Preferably, the composition (x) is an acrylic pressure sensitive adhesive containing the above-mentioned functional group-having acrylic resin (A) and crosslinking agent (B), more preferably an acrylic pressure sensitive adhesive containing the above-mentioned acrylic copolymer (A1) and crosslinking agent (B).

The details of the acrylic pressure sensitive adhesive are as mentioned above.

The composition (x) may contain the above-mentioned fine particles, in which the content of the fine particles is less than 15% by mass and is smaller than the content of the resin contained in the composition (x).

Specifically, the content of the fine particles is less than 15% by mass, and is preferably 0 to 13% by mass, more preferably 0 to 10% by mass, even more preferably 0 to 5% by mass, still more preferably 0% by mass, relative to the total amount (100% by mass (but excluding diluent solvent)) of the composition (x).

(Composition (y))

The composition (y) is a forming material for the particle part (Y), and contains at least the above-mentioned fine particles in an amount of 15% by mass or more, but from the viewpoint of the dispersibility of the fine particles therein, the composition preferably contains a resin along with the fine particles, and more preferably further contains a crosslinking agent along with the rein. The composition (y) may contain any ordinary additive.

These resin, crosslinking agent and ordinary additive may be the forming material for the resin part (X).

The fine particles to be contained in the composition (y) include those mentioned hereinabove, and from the viewpoint of forming the void part (Z) in the resin layer to provide a pressure sensitive adhesive sheet having improved blister resistance, one or more kinds selected from silica particles, metal oxide particles and smectite are preferred.

The content of the fine particles in the composition (y) is, from the viewpoint of facilitating the formation of irregular concave portions on the surface (α) of the resin layer through self-formation of the resin layer, 15% by mass or more, and is preferably 20 to 100% by mass, more preferably 25 to 90% by mass, even more preferably 30 to 85% by mass, still more preferably 35 to 80% by mass, relative to the total amount (100% by mass (but excluding diluent solvent)) of the resin composition (y).

The resin to be contained in the composition (y) includes the same ones as those of the resin to be contained in the above-mentioned composition (x), and preferably contains the same resin as in the composition (x). One alone or two or more kinds of these resins may be used either singly or as combined.

More specifically, the resin to be contained in the composition (y) is preferably a resin having a functional group, more preferably the above-mentioned functional group-having acrylic resin (A), even more preferably the above-mentioned acrylic copolymer (A1).

The content of the resin in the composition (y) is generally 1 to 85% by mass, and is preferably 5 to 80% by mass, more preferably 10 to 75% by mass, even more preferably 20 to 70% by mass, further more preferably 25 to 65% by mass, relative to the total amount (100% by mass (but excluding diluent solvent)) of the composition (y).

The crosslinking agent to be contained in the composition (y) includes those of the crosslinking agent to be contained in the above-mentioned resin part (X), but the composition (y) preferably contains at least one or more selected from a metal chelate crosslinking agent and an epoxy crosslinking agent, more preferably a metal chelate crosslinking agent. Also preferably, the composition (y) contains both a metal chelate crosslinking agent and an epoxy crosslinking agent.

In the case where the composition (y) contains both a metal chelate crosslinking agent and an epoxy crosslinking agent, a preferred range of the content ratio of the metal chelate crosslinking agent to the epoxy crosslinking agent is the same as in the above-mentioned composition (x).

The content of the crosslinking agent is preferably 0.01 to 15 parts by mass, and is more preferably 0.1 to 10 parts by mass, even more preferably 0.3 to 7.0 parts by mass, relative to 100 parts by mass of the resin contained in the composition (y).

(Formation Method for Coating Film (x'), (y'))

For facilitating the formation of a coating film, it is desirable that a solvent is incorporated in the composition (x) or (y) to give a solution of the composition.

The solvent includes water, organic solvents, etc.

Examples of the organic solvent include toluene, ethyl acetate, butyl acetate, methyl ethyl ketone, methyl isobutyl ketone, methanol, ethanol, isopropyl alcohol, t-butanol, s-butanol, acetylacetone, cyclohexanone, n-hexane, cyclohexane, etc. One alone or two or more of these solvents may be used either singly or as combined.

The order of laminating the coating films (x') and (y') to be formed in this step is not specifically limited, but preferably, the coating film (x') is laminated on the coating film (y').

Regarding the formation method for the coating films (x') and (y'), there may be employed a successive formation method of forming a coating film (y') and then forming a coating film (x') on the coating film (y'), or from the viewpoint of productivity, there may also be employed a simultaneous coating method of coating with both the coating film (y') and the coating film (x') using a multilayer coater.

Examples of the coater for use in successive formation include a spin coater, a spray coater, a bar coater, a knife coater, a roll coater, a knife roll coater, a blade coater, a gravure coater, a curtain coater, a die coater, etc.

Examples of the coater for use in simultaneous coating with a multilayer coater include a curtain coater, a die coater, etc., and among these, a die coater is preferred from the viewpoint of operability.

In this step (1), after the formation of at least one of the coating film (x') and the coating film (y') and prior to the step (2), pre-drying treatment may be carried out in such a degree that the curing reaction of the coating film could not go on.

The drying temperature in the pre-drying treatment in this step (1) is generally settled within a temperature range in which the formed coating film is not cured, but is preferably lower than the drying temperature in the step (2). A specific drying temperature indicated by the definition of indicating a range "lower than the drying temperature in the step (2)" is preferably 10 to 45° C., more preferably 10 to 34° C., even more preferably 15 to 30° C.

<Step (2)>

The step (2) is a step of drying the coating film (x') and the coating film (y') formed in the step (1) simultaneously.

In this step, the coating film (x') and the coating film (y') formed are dried simultaneously, whereby a resin layer containing the resin part (X) and the particle part (Y) is formed and in addition, plural concave portions are formed on the surface (α) of the resin layer.

The drying temperature in this step is, from the viewpoint of facilitating the formation of the plural concave portions satisfying the requirements (1) and (2), namely, the requirements (I) and (II) on the surface (α) of the resin layer to be formed, preferably 35 to 200° C., more preferably 60 to 180° C., even more preferably 70 to 160° C., still more preferably 80 to 140° C.

When the drying temperature is 35° C. or higher, a pressure sensitive adhesive sheet having good air escape property can be obtained. On the other hand, when the drying temperature is 200° C. or lower, the substrate and the release material that the pressure sensitive adhesive sheet has can be free from trouble of shrinkage thereof.

When the drying temperature is lower, the height difference of the concave portions to be formed could increase but the number of the concave portions to be formed tends to decrease.

In the vicinity of the particle part (Y) of the resin layer to be formed in this step, a void part (Z) may be formed.

The void part (Z) can be readily formed by using at least one or more kinds selected from silica particles, metal oxide particles and smectite as the fine particles to be contained in the composition (y).

In the case where a pressure sensitive adhesive sheet having a resin layer having a multilayer structure is produced in which the multilayer structure is formed by laminating a layer (Xβ) mainly containing the resin part (X), a layer (Y1) containing the particle part (Y) in an amount of 15% by mass or more, and a layer (Xα) mainly containing the resin part (X) in this order, like the pressure sensitive adhesive sheet 1a of FIG. 1(a), a production method of the following first and second embodiments is preferred.

In the description of the production method of the following first and second embodiments, the "composition (xβ) or (xα) containing a resin as a main component" is the same as the above-mentioned composition (x), and the details of the constituent components contained in the composition (xβ) or (xα) (kind of the component, preferred components, content of the component, etc.) are also the same as in the latter. The "composition (y) containing fine particles in an amount of 15% by mass or more" is also as mentioned above.

[Production Method of First Embodiment]

The production method of the first embodiment has at least the following steps (1A) and (2A).

Step (1A): a step of forming, on a substrate or a release material, a coating film (xβ') of a composition (xβ) containing a resin as a main component, a coating film (y') of a composition (y) containing fine particles in an amount of 15% by mass or more and a coating film (xα') of a composition (xα) containing a resin as a main component, as laminated thereon in this order Step (2A): a step of drying the coating film (xβ'), the coating film (y') and the coating film (xα') formed in the step (1A) simultaneously Also in the step (1A), it is desirable that the above-mentioned solvent is incorporated in the composition (xβ), the composition (y) and the composition (xα) to form solutions of the individual compositions, and the resultant solutions are used for coating.

Regarding the formation method for the coating film (xβ'), the coating film (y') and the coating film (xα'), there may be employed a successive formation method of forming a coating film (xβ') on a substrate or a release material, then forming a coating film (y') on the coating film (xβ'), and further forming a coating film (xα') on the coating film (y'), using the above-mentioned coater, or a simultaneous coating method of forming a coating film (xβ'), a coating film (y') and a coating film (xα'), using the above-mentioned multilayer coater.

In the step (1A), after formation of one or more coating films of the coating film (xβ'), the coating film (y') and the coating film (xα') and prior to the step (2A), pre-drying treatment may be carried out in such a degree that the curing reaction of the coating films could not go on.

For example, after formation of the coating film (xβ'), the coating film (y') and the coating film (xα'), such pre-drying treatment may be carried out every time after the formation, or after the formation of the coating film (xβ') and the coating film (y'), the two may be subjected to the pre-drying treatment all together, and then the coating film (xα') may be formed thereon.

In this step (1A), the drying temperature for the pre-drying treatment is generally so settled as to fall within a temperature range in which the formed coating film is not cured, but is preferably lower than the drying temperature in the step (2A). A specific drying temperature indicated by the definition of indicating a range "lower than the drying temperature in the step (2A)" is preferably 10 to 45° C., more preferably 10 to 34° C., even more preferably 15 to 30° C.

The step (2A) is a step of drying the coating film (xβ'), the coating film (y') and the coating film (xα') formed in the step (1A), simultaneously. The preferred range of the drying temperature in this step is the same as that in the above-mentioned step (2). In this step, a resin layer containing the resin part (X) and the particle part (Y) is formed.

[Production Method of Second Embodiment]

The production method of the second embodiment has at least the following steps (1B) and (2B).

Step (1B): a step of forming, on a layer (Xβ) mainly containing a resin part (X) that is provided on a substrate or a release material, a coating film (y') of a composition (y) containing fine particles in an amount of 15% by mass or more and a coating film (xα') of a composition (xα) containing a resin as a main component, as laminated thereon in this order Step (2B): a step of drying the coating film (y') and the coating film (xα') formed in the step (1B) simultaneously In the step (1B), the "layer (Xβ) mainly containing a resin part (X)" is formed by drying the above-mentioned coating film (xβ') of a composition (xβ) containing a resin as a main component.

Since the layer (Xβ) is formed of the composition (xβ), the layer (Xβ) may contain a crosslinking agent, an ordinary additive and others in addition to the resin therein. The content of the resin part (X) in the layer (Xβ) is as described above.

Regarding the formation method for the layer (Xβ), a coating film (xβ') of a composition (xβ) containing a resin as a main component is formed on a substrate or a release material, and the coating film (xβ') is dried to form the layer.

The drying temperature at this time is not specifically limited, but is preferably 35 to 200° C., more preferably 60 to 180° C., even more preferably 70 to 160° C., still more preferably 80 to 140° C.

This embodiment differs from the above-mentioned first embodiment in that the coating film (y') and the coating film (xα') are formed in this order on the layer (Xβ) formed by drying, but not on the coating film (xβ').

Also in the step (1B), it is desirable that the above-mentioned solvent is incorporated in the composition (y) and the composition (xα) to form solutions of the respective compositions, and thereafter the solutions are used for coating.

Regarding the formation method for the coating film (y') and the coating film (xα'), there may be employed a successive formation method of forming a coating film (y') on the layer (Xβ) and then forming a coating film (xα') on the coating film (y'), using the above-mentioned coater, or a simultaneous coating method of coating with both the coating film (y') and the coating film (xα') using a multilayer coater.

In the step (1B), after formation of the coating film (y') or after formation of the coating film (y') and the coating film (xα') and prior to the step (2B), pre-drying treatment may be carried out in such a degree that the curing reaction of the coating films could not go on.

In this step (1B), the drying temperature for the pre-drying treatment is generally so settled as to fall within a temperature range in which the formed coating film is not cured, but is preferably lower than the drying temperature in the step (2B). A specific drying temperature indicated by the definition of indicating a range "lower than the drying temperature in the step (2B)" is preferably 10 to 45° C., more preferably 10 to 34° C., even more preferably 15 to 30° C.

The step (2B) is a step of drying the coating film (y') and the coating film (xα') formed in the step (1B) simultaneously, and the preferred range of the drying temperature in this step is the same as in the above-mentioned step (2). In this step, a resin layer containing the resin part (X) and the particle part (Y) is formed.

EXAMPLES

The present invention will be described more specifically with reference to the following examples, but the present invention is not limited to the following examples. The property values in the following examples and production examples are values measured by the following methods.
Mass Average Molecular Weight of Resin (Mw)

The measurement was performed by using a gel permeation chromatography instrument ("HLC-8020, a product name, produced by Tosoh Corporation) under the following conditions, and a value measured as the standard polystyrene conversion was used.
Measurement Condition
  Column: "TSK guard column HXL-L", "TSK gel G2500HXL", "TSK gel G2000HXL", and "TSK gel G1000HXL" (all produced by Tosoh Corporation), connected in series
  Column temperature: 40° C.
  Developing solvent: tetrahydrofuran
  Flow rate: 1.0 mL/min
Measurement of Volume Average Secondary Particle Diameter of Silica Particles The volume average secondary particle diameter of the silica particles was obtained by measuring the particle size distribution with Multisizer III (produced by Beckman Coulter Inc.) by the Coulter Counter method.
Measurement of Thickness of Resin Layer The thickness of the resin layer was measured by observing the cross section of the resin layer of the target pressure sensitive adhesive sheet with a scanning electron microscope ("S-4700", a product name, produced by Hitachi, Ltd.). The values of the thickness of the resin layer shown in Tables 3 and 4 are those obtained according to the measurement method.

Production Examples x-1 to x-6

Preparation of Solutions (x-1) to (x-6) of Resin Composition

To 100 parts by mass of the solution of an acrylic resin with the kind and the solid content shown in Table 1, a crosslinking agent and a diluting solvent with the kinds and the mixed amounts shown in Table 1 were added, so as to prepare solutions (x-1) to (x-6) of a resin composition having the solid contents shown in Table 1.

The details of the components shown in Table 1 used for the preparation of the solutions (x-1) to (x-6) of a resin composition are as follows.
Solution of Acrylic Resin
  Solution (i): a mixed solution of toluene and ethyl acetate containing an acrylic resin (x-i) (an acrylic copolymer having structural units derived from butyl acrylate (BA) and acrylic acid (AA), BA/AA=90/10 (% by mass), Mw: 470,000) having a solid concentration of 33.6% by mass
  Solution (ii): a mixed solution of toluene and ethyl acetate containing an acrylic resin (x-ii) (an acrylic copolymer having structural units derived from butyl acrylate (BA), 2-ethylhexyl acrylate (2EHA), vinyl acetate (VAc), and acrylic acid (AA), BA/2EHA/VAc/AA=46/37/10/7 (% by mass), Mw: 370,000) having a solid concentration of 43.0% by mass
Crosslinking Agent
  Aluminum chelate crosslinking agent: "M-5A", a product name, produced by Soken Chemical & Engineering Co., Ltd., solid concentration: 4.95% by mass
  Epoxy crosslinking agent: a solution of an epoxy crosslinking agent obtained by diluting "TETRAD-C" (a product name, produced by Mitsubishi Gas Chemical Co., Inc.) with toluene to make a solid concentration of 5% by mass
  Isocyanate crosslinking agent: "Coronate L", a product name, produced by Tosoh Corporation, solid concentration: 75% by mass
  Aziridine crosslinking agent: "BXX5134", a product name, produced by Toyochem Co., Ltd., solid concentration: 5% by mass
Diluting Solvent
  IPA: isopropyl alcohol
  AcOEt: ethyl acetate

TABLE 1

| | | | Solution of acrylic resin | | | Aluminum chelate crosslinking agent (M-5A, solid concentration: 4.95 wt %) | | | Epoxy crosslinking agent (TETRAD-C, solid concentration: 5 wt %) | |
|---|---|---|---|---|---|---|---|---|---|---|
| | Solution of resin composition | Kind | Kind of resin | Mixed amount (part by mass) | Mixed amount of solid content (part by mass) | Mixed amount (part by mass) | Mixed amount of solid content (part by mass) | Solid content per 100 parts by mass of acrylic resin (part by mass) | Mixed amount (part by mass) | Mixed amount of solid content (part by mass) |
| Production Example x-1 | (x-1) | solution (i) | acrylic resin (x-i) (BA/AA = 90/10 (wt %), Mw: 470,000 | 100 | 33.6 | 5 | 0.25 | 0.74 | — | — |
| Production Example x-2 | (x-2) | solution (i) | acrylic resin (x-i) (BA/AA = 90/10 (wt %), Mw: 470,000 | 100 | 33.6 | — | — | — | — | — |

TABLE 1-continued

| | | | | | | | | | | |
|---|---|---|---|---|---|---|---|---|---|---|
| Production Example x-3 | (x-3) | solution (ii) | Acrylic resin (x-ii) (BA/2EHA/VAc/AA = 46/37/10/7 (wt %), Mw: 370,000 | 100 | 43.0 | 4.5 | 0.22 | 0.52 | 0.3 | 0.015 |
| Production Example x-4 | (x-4) | solution (i) | acrylic resin (x-i) (BA/AA = 90/10 (wt %), Mw: 470,000 | 100 | 33.6 | — | — | — | 0.6 | 0.030 |
| Production Example x-5 | (x-5) | solution (i) | acrylic resin (x-i) (BA/AA = 90/10 (wt %), Mw: 470,000 | 100 | 33.6 | — | — | — | — | — |
| Production Example x-6 | (x-6) | solution (i) | acrylic resin (x-i) (BA/AA = 90/10 (wt %), Mw: 470,000 | 100 | 33.6 | — | — | — | — | — |

| | Epoxy crosslinking agent (TETRAD-C, solid concentration: 5 wt %) | Isocyanate crosslinking agent (Coronate L, solid concentration: 75 wt %) | | | Azindine crosslinking agent (BXX5134, solid concentration: 5 wt %) | | | | Solid concentration of solution of resin composition (% by mass) |
|---|---|---|---|---|---|---|---|---|---|
| | Solid content per 100 parts by mass of acrylic resin (part by mass) | Mixed amount (part by mass) | Mixed amount of solid content (part by mass) | Solid content per 100 parts by mass of acrylic resin (part by mass) | Mixed amount (part by mass) | Mixed amount of solid content (part by mass) | Solid content per 100 parts by mass of acrylic resin (part by mass) | Diluting solvent Kind | |
| Production Example x-1 | — | — | — | — | — | — | — | IPA | 28 |
| Production Example x-2 | — | — | — | — | — | — | — | IPA | 27 |
| Production Example x-3 | 0.035 | — | — | — | — | — | — | IPA | 34.4 |
| Production Example x-4 | 0.089 | — | — | — | — | — | — | IPA | 24 |
| Production Example x-5 | — | 1.5 | 0.56 | 1.674 | — | — | — | AcOEt | 28 |
| Production Example x-6 | — | — | — | — | 1.0 | 0.050 | 0.149 | AcOEt | 28 |

Production Example y-0

Preparation of Fine Particle Dispersion Liquid (y-0)

To 100 parts by mass (solid content: 33.6 parts by mass) of the solution (i) containing the acrylic resin (x-i) (a mixed solution of toluene and ethyl acetate containing an acrylic copolymer having structural units derived from butyl acrylate (BA) and acrylic acid (AA) (BA/AA=90/10 (% by mass), Mw: 470,000) having a solid concentration of 33.6% by mass), 50.4 parts by mass (solid content: 50.4 parts by mass) of silica particles ("Nipsil E-200A", a product name, produced by Tosoh Silica Corporation, volume average secondary particle diameter: 3 μm) and toluene were added, and the fine particles were dispersed, so as to prepare a fine particle dispersion liquid (y-0) having a solid concentration of 30% by mass containing the acrylic resin and the silica particles.

Production Examples y-1 to y-8

Preparation of Coating Liquids (y-1) to (y-8) for Forming Coating Film (y')

To the mixed amount shown in Table 2 of the fine particle dispersion liquid (y-0) produced in Production Example y-0, the kinds and the mixed amounts shown in Table 2 of the solution of an acrylic resin, the crosslinking agent, and the diluting solvent were added, so as to prepare coating liquids (y-1) to (y-8) for forming a coating film (y') having the solid concentrations shown in Table 2.

The details of the components shown in Table 2 used for the preparation of the coating liquids (y-1) to (y-8) for forming a coating film (y') are as follows.

Solution of Acrylic Resin

Solution (i): acrylic resin (x-i) (the details thereof are described above)

Crosslinking Agent

Aluminum chelate crosslinking agent: "M-5A", a product name, produced by Soken Chemical & Engineering Co., Ltd., solid concentration: 4.95% by mass Epoxy crosslinking agent: a solution of an epoxy crosslinking agent obtained by diluting "TETRAD-C" (a product name, produced by Mitsubishi Gas Chemical Co., Inc.) with toluene to make a solid concentration of 5% by mass Diluting Solvent IPA: isopropyl alcohol IPA/CHN: mixed solvent containing isopropyl alcohol (IPA) and cyclohexanone (CHN) (IPA/CHN=60/40 (mass ratio))

TABLE 2

| | Fine particle dispersion liquid (y-0) produced in Production Example y-0 (solid concentration: 30 wt %) | | | Solution of acrylic resin | | | |
|---|---|---|---|---|---|---|---|
| | Coating liquid for forming coated layer (y') | Mixed amount (part by mass) | Mixed amount of solid content (part by mass) | Content of fine particles (*) (part by mass) | Kind | Kind or resin | Mixed amount (part by mass) | Mixed amount of solid content (part by mass) |
| Production Example y-1 | (y-1) | 69.7 | 20.9 | 12.5 | solution (i) | acrylic resin (x-i) (BA/AA = 90/10 (wt %), Mw: 470,000 | 30.3 | 10.2 |
| Production Example y-2 | (y-2) | 61.6 | 18.5 | 11.1 | solution (i) | acrylic resin (x-i) (BA/AA = 90/10 (wt %), Mw: 470,000 | 38.4 | 12.9 |
| Production Example y-3 | (y-3) | 77.6 | 23.3 | 14.0 | solution (i) | acrylic resin (x-i) (BA/AA = 90/10 (wt %), Mw: 470,000 | 22.4 | 7.5 |
| Production Example y-4 | (y-4) | 85.4 | 25.6 | 15.4 | solution (i) | acrylic resin (x-i) (BA/AA = 90/10 (wt %), Mw: 470,000 | 14.6 | 4.9 |
| Production Example y-5 | (y-5) | 71.0 | 21.3 | 12.8 | solution (i) | acrylic resin (x-i) (BA/AA = 90/10 (wt %), Mw: 470,000 | 29.0 | 9.7 |
| Production Example y-6 | (y-6) | 69.7 | 20.9 | 12.5 | solution (i) | acrylic resin (x-i) (BA/AA = 90/10 (wt %), Mw: 470,000 | 30.3 | 10.2 |
| Production Example y-7 | (y-7) | 71.0 | 21.3 | 12.8 | solution (i) | acrylic resin (x-i) (BA/AA = 90/10 (wt %), Mw: 470,000 | 29.0 | 9.7 |
| Production Example y-8 | (y-8) | 71.0 | 21.3 | 12.8 | solution (i) | acrylic resin (x-i) (BA/AA = 90/10 (wt %), Mw: 470,000 | 29.0 | 9.7 |

| | Aluminum chelate crosslinking agent (M-5A, solid concentration: 4.95 wt %) | | | Epoxy crosslinking agent (TETRAD-C, solid concentration: 5 wt %) | | | | Concentration | |
|---|---|---|---|---|---|---|---|---|---|
| | Mixed amount (part by mass) | Mixed amount of solid content (part by mass) | Solid content per 100 parts by mass of acrylic resin (part by mass) | Mixed amount (part by mass) | Mixed amount of solid content (part by mass) | Solid content per 100 parts by mass of acrylic resin (part by mass) | Diluting solvent Kind | Solid concentration of coating liquid (% by mass) | of fine particles in solid content of coating liquid (**) (% by mass) |
| Production Example y-1 | 5.52 | 0.27 | 1.47 | — | — | — | IPA | 27 | 40 |
| Production Example y-2 | 6.04 | 0.30 | 1.47 | — | — | — | IPA | 27 | 35 |
| Production Example y-3 | 5.01 | 0.25 | 1.47 | — | — | — | IPA | 27 | 45 |
| Production Example y-4 | 4.51 | 0.22 | 1.47 | — | — | — | IPA | 27 | 50 |
| Production Example y-5 | 5.44 | 0.27 | 1.47 | — | — | — | IPA/CHN | 26 | 41 |
| Production Example y-6 | — | — | — | — | — | — | IPA | 27 | 40 |
| Production Example y-7 | — | — | — | 0.66 | 0.033 | 0.18 | IPA | 26 | 41 |
| Production Example y-8 | 2.72 | 0.13 | 0.74 | 0.33 | 0.017 | 0.09 | IPA | 26 | 41 |

(*): value calculated from (solid mixed amount) × 50.4/(50.4 + 33.6)
(**): value calculated from (content of fine particles)/((solid mixed amount in fine particle dispersion liquid (y-0)) + (solid mixed amount of acrylic resin) + (solid mixed amount of aluminum chelate crosslinking agent) + (solid mixed amount of epoxy crosslinking agent)) × 100

Examples 1 to 8

(1) Formation of Coating Film

A polyethylene terephthalate (PET) film having an aluminum vapor deposition layer on one surface thereof ("FNS MAT N50", a product name, produced by Lintec Corporation, thickness: 50 μm) was used as a substrate.

On the aluminum vapor deposition layer of the PET film, the solution (x-1) of a resin composition prepared in Production Example x-1 was coated with an applicator to the thickness shown in Table 3 as the thickness of the coating film after coating (i.e., the thickness of the coating film in a non-dried state), so as to form a coating film (xβ').

Subsequently, on the coating film (xβ') thus formed, one of the coating liquids (y-1) to (y-4) for forming a coating film (y') of the kinds shown in Table 3 was coated with an applicator to the thickness shown in Table 3 as the total thickness after coating both the two layers, i.e., the coating film (xβ') and a coating film (y') (i.e., the total thickness of the two layers in a non-dried state), so as to form a coating film (y').

Then, on the coating film (y') thus formed, the solution (x-1) of a resin composition prepared in Production Example x-1 was coated with an applicator to the thickness shown in Table 3 as the total thickness after coating all the three layers, i.e., the coating film (xβ'), the coating film (y'), and a coating film (xα') (i.e., the total thickness of the three layers in a non-dried state), so as to form a coating film (xα').

(2) Drying Treatment

The three layers of the coating film (xβ'), the coating film (y'), and the coating film (xα') were simultaneously dried at a drying temperature of 100° C. for 2 minutes, thereby producing a pressure sensitive adhesive sheet with a substrate, having a resin layer containing a resin part (X) and a particle part (Y) having the thickness shown in Table 3.

Example 9

A PET film having an aluminum vapor deposition layer on one surface thereof ("FNS MAT N50", a product name, produced by Lintec Corporation, thickness: 50 μm) was used as a substrate.

On the aluminum vapor deposition layer of the PET film, the solution (x-2) of a resin composition prepared in Production Example x-2 was coated with a knife coater to a thickness of 25 μm as the thickness of the coating film after coating (i.e., the thickness of the coating film in a non-dried state), so as to form a coating film (xβ'), which was then dried at a drying temperature of 100° C. for 2 minutes, so as to form a layer (Xβ) containing a resin part (X).

Lamination was performed in such a manner that the surface of the layer (Xβ) thus formed was attached to a release agent layer of a release film ("SP-PET381031", a product name, produced by Lintec Corporation, a PET film having a silicone release agent layer provided on one surface thereof, thickness: 38 μm), so as to produce once a laminated body having the layer (Xβ).

Subsequently, on the surface of the layer (Xβ) having been exposed by removing the release film of the laminated body, the coating liquid (y-1) for forming a coating film (y') prepared in Production Example y-1 and the solution (x-1) of a resin composition prepared in Production Example x-1 were simultaneously coated with a multilayer die coater (width: 500 mm), so as to form a coating film (y') and a coating film (xα') simultaneously in this order on the layer (Xβ). The coated layers were formed to a thickness of 55 μm for the coating film (y') and a thickness of 65 μm for the coating film (xα') through the setting of the multilayer die coater.

Then, the two layers of the coating film (y') and the coating film (xα') were simultaneously dried at a drying temperature of 100° C. for 2 minutes, thereby producing a pressure sensitive adhesive sheet with a substrate, having a resin layer containing a resin part (X) and a particle part (Y) having the thickness shown in Table 3.

Comparative Example 1

A pressure sensitive adhesive sheet with a substrate, having a resin layer containing only a resin part (X) having a thickness of 25 μm was produced in the same manner as in Example 1, except that the coating film (y') and the coating film (xα') in Example 1 were not formed, but on the aluminum vapor deposition layer of the PET film used as the substrate, the solution (x-1) of a resin composition prepared in Production Example x-1 was coated with a knife coater to a thickness of 25 μm after drying to form a coating film (xβ').

Comparative Example 2

A PET film having an aluminum vapor deposition layer on one surface thereof ("FNS MAT N50", a product name, produced by Lintec Corporation, thickness: 50 μm) was used as a substrate.

On the aluminum vapor deposition layer of the PET film, the solution (x-1) of a resin composition prepared in Production Example x-1 was coated with an applicator to form a coating film (xβ'), which was then dried at 100° C. for 2 minutes, so as to form a layer (Xβ) containing a resin part (X) having a thickness of 5 μm.

Separately from the above, on a release agent layer of a release film ("SP-PET381031", a product name, produced by Lintec Corporation, a PET film having a silicone release agent layer provided on one surface thereof, thickness: 38 μm), the coating liquid (y-1) for forming a coating film (y') prepared in Production Example y-1 was coated with an applicator to form a coated layer (y'), which was then dried at 100° C. for 2 minutes, so as to form a layer (Y1) containing a resin part (X) and a particle part (Y) having a thickness of 15 μm.

Further separately from the above, on a release agent layer of a release film of the same kind as above, the solution (x-1) of a resin composition prepared in Production Example x-1 was coated with an applicator to form a coating film (xα'), which was then dried at 100° C. for 2 minutes, so as to form a layer (Xα) containing a resin part (X) having a thickness of 5 μm.

Then, lamination was performed in such a manner that the surface of the layer (Xβ) formed on the PET film as the substrate was attached to the exposed surface of the layer (Y1) thus formed. Furthermore, lamination was performed in such a manner that the surface of the layer (Y1) having been exposed by removing the release film on the layer (Y1) was attached to the exposed surface of the layer (Xα) thus formed.

According to the procedures, a pressure sensitive adhesive sheet with a substrate, having a resin layer containing a resin part (X) and a particle part (Y) having a thickness of 25 μm, containing the substrate having laminated in this order thereon the layer (Xβ), the layer (Y1), and the layer (Xα) was produced.

Examples 10 to 16

A PET film having an aluminum vapor deposition layer on one surface thereof ("FNS MAT N50", a product name, produced by Lintec Corporation, thickness: 50 μm) was used as a substrate.

On the aluminum vapor deposition layer of the PET film, one of the solutions (x-1) to (x-6) of a resin composition prepared in Production Examples x-1 to x-6 and one of the coating liquids (y-1) to (y-8) for forming a coating film (y') prepared in Production Examples y-1 to y-8 were simultaneously coated with a multilayer die coater (width: 250 mm) at the flow rate and the coating speed shown in Table 4, so as to form a coating film (xβ'), a coating film (y'), and a coating film (xα') simultaneously in this order from the side of the substrate.

The kind of the solution of the resin composition and the kind of the coating liquid for forming a coated layer (y') used as formation materials of the coating films are shown in Table 4.

The three layers of the coating film (xβ'), the coating film (y'), and the coating film (xα') were simultaneously dried at a drying temperature of 100° C. for 2 minutes, thereby producing a pressure sensitive adhesive sheet with a substrate, having a resin layer containing a resin part (X) and a particle part (Y) having the thickness shown in Table 4.

Example 17

On a release agent layer of a release film ("SP-PET381031", a product name, produced by Lintec Corporation, a PET film having a silicone release agent layer provided on one surface thereof, thickness: 38 μm) as a first release material, the solution (x-3) of a resin composition prepared in Production Example x-3, the coating liquid (y-5) for forming a coating film (y') prepared in Production Example y-5, and the solution (x-3) of a resin composition prepared in Production Example x-3 were simultaneously coated in this order with a multilayer die coater (width: 250 mm) at the flow rate and the coating speed shown in Table 4, so as to form a coating film (xβ'), a coating film (y'), and a coating film (xα') simultaneously in this order from the side of the release film.

Then, the three layers of the coating film (xβ'), the coating film (y'), and the coating film (xα') were simultaneously dried at a drying temperature of 100° C. for 2 minutes, so as to form a resin layer containing a resin part (X) and a particle part (Y) having the thickness shown in Table 4. Then, lamination was performed in such a manner that the surface (α) of the resin layer thus formed was attached to a surface of a release agent layer of a release film ("SP-PET386040", a product name, produced by Lintec Corporation) as a second release material, thereby producing a pressure sensitive adhesive sheet without a substrate.

Subsequently, after allowing to stand the pressure sensitive adhesive sheet without a substrate under an environment at 23° C. for one week, the first release material was removed, and lamination was performed in such a manner that the exposed surface (β) of the resin layer was attached to a surface of an aluminum vapor deposition layer of a PET film having an aluminum vapor deposition layer ("FNS MAT N50", a product name, produced by Lintec Corporation, thickness: 50 μm) as a substrate, thereby providing a pressure sensitive adhesive sheet with a substrate.

Example 18

A PET film having an aluminum vapor deposition layer on one surface thereof ("FNS MAT N50", a product name, produced by Lintec Corporation, thickness: 50 μm) was used as a substrate.

On the aluminum vapor deposition layer of the PET film, the solution (x-1) of a resin composition prepared in Production Example x-1 was coated with a knife coater to form a coating film (xβ'), which was then dried at 100° C. for 2 minutes, so as to form a layer (Xβ) containing a resin part (X) having a thickness of 8 μm. Lamination was performed in such a manner that the surface of the layer (Xβ) thus formed was attached to a surface of a release agent layer of a release film ("SP-PET381031", a product name, produced by Lintec Corporation, a PET film having a silicone release agent layer provided on one surface thereof, thickness: 38 μm), so as to produce once a laminated body having the layer (Xβ).

Subsequently, on the surface of the layer (Xβ) having been exposed by removing the release film of the laminated body, the coating liquid (y-1) for forming a coating film (y') prepared in Production Example y-1 and the solution (x-1) of a resin composition prepared in Production Example x-1 were simultaneously coated in this order with a multilayer die coater (width: 500 mm) at the flow rate and the coating speed shown in Table 4, so as to form a coating film (y') and a coating film (xα') simultaneously in this order from the side of the layer (Xβ).

Then, the two layers of the coating film (y') and the coating film (xα') were simultaneously dried at a drying temperature of 100° C. for 2 minutes, thereby producing a pressure sensitive adhesive sheet with a substrate, having a resin layer containing a resin part (X) and a particle part (Y) having the thickness shown in Table 4.

With respect to each of the pressure sensitive adhesive sheets produced in Examples and Comparative Examples, the shapes of the one or more concave portions on the surface (α), the areal ratio ($S_1$) before heating, the areal ratio ($S_2$) after heating, the area increase rate $\{[(S_2-S_1)/S_1]\times100\}$, the mass retention rate of the resin layer and the like were observed or measured according to the methods described below. The results are shown in Tables 3 and 4.

<Formation of One or More Concave Portions on Surface (α)>

A specific region defined by the requirements on the surface (α) of the resin layer of the pressure sensitive adhesive sheet produced in Examples and Comparative Examples was checked for formation of one or more concave portions satisfying the following requirements (I) to (II), using a scanning electron microscope (trade name "S-4700", manufactured by Hitachi Limited, for the requirement (II), the magnification for observation was 30).

In Table 3 and Table 4, those judged to have one or more concave portions satisfying the requirements formed therein were given "A", and those not judged to have one or more concave portions satisfying the requirements were given "F".

Requirement (I): Plural concave portions having a maximum height difference of 0.5 μm or more exist in a region (P) surrounded by a square having an edge length of 5 mm that is arbitrarily selected on the surface (α).

Requirement (II): Relative to the total number (100%) of plural concave portions having a maximum height difference of 0.5 μm or more existing inside a region (P) surrounded by a square having an edge length of 5 mm that is arbitrarily selected on the surface (α), the number of the concave portions that have shapes differing from each other is 95% or more (in the case of 100%, that is, in the case where all the concave portions inside the region (P) have shapes differing from each other, the tested sheets were given "A+" in the Tables.) In evaluation of the requirement (I), a largest value of the measured plural height differences of the concave portions is referred to as "maximum height difference" as shown in Table 3 and Table 4.

<Areal Ratio of Attached Area in Surface (α) Before Heating: $S_1$>

As "light transmissive adherend having a smooth surface", alkali-free glass (trade name "Eagle XG" manufactured by Corning Incorporated) was used.

Ten values were calculated through the following operations (i) to (iii), and a mean value of these 10 values was considered as the "areal ratio of the attached area in the surface (α)" of the targeted pressure sensitive adhesive sheet. The measurement results in Examples and Comparative Examples are shown in Table 3 and Table 4.

Operation (i): As shown in FIG. 4(a), the pressure sensitive adhesive sheet produced in Examples and Comparative Examples was set in such a manner that the surface (α) 12 of the resin layer 12 of the pressure sensitive adhesive sheet could be kept in contact with the smooth surface 100a of a light transmissive adherend 100. With that, a 2-kg roller (application device prescribed by JIS Z 0237:2000 10.2.4) was pressed against the substrate 11 of the pressure sensitive adhesive sheet for 5 reciprocating motions to thereby adhere the surface (α) 12a of the resin layer 12 to the smooth surface 100a of the light transmissive adherend 100. Accordingly, a laminate set in the direction shown in FIG. 4(a) was prepared.

Operation (ii): Using a digital microscope (trade name, "Digital Microscope VHX-1000" manufactured by Keyence Corporation), the interface between the smooth surface 100a of the light transmissive adherend 100 and the surface (α) 12a of the resin layer was photographed in the direction W in FIG. 4(a), from the side of the light transmissive adherend 100 of the laminate prepared in the operation (i), in a region (Q) surrounded by an arbitrarily selected square having an edge length of 1 mm on the surface (α) 12a, thereby giving a digital picture of the selected region (Q). Ten such regions (Q) were selected to give ten digital images. The operation was carried out in an environment at 23° C. and 50% RH.

Operation (iii): Using image analysis software (trade name "Image-Pro Plus", manufactured by Media Cybernetics Corporation), the digital images were processed by the image processing (binarized processing) to give binarized images. Based on the binarized images, the area S of the attached area kept in contact with the smooth surface of the light transmissive adherend in the total area of the selected region (Q) was determined, and according to a math formula "[areal ratio (%) of attached area]=S/total area of selected region (Q)×100", the areal ratio of the attached area to the light transmissive adherend in the selected region (Q) was calculated.

Ten digital images were processed according to the same operation, and the resultant values of "areal ratio of attached area" were averaged to give a mean value. The results are shown in Table 3 and Table 4.

<Areal Ratio of Attached Area in Surface (α) after Heating: $S_2$>

As in the requirement (2), after the laminate was statically left in an environment at 80° C. for 30 minutes, the areal ratio after heating ($S_2$) of the attached area to the smooth surface of the light transmissive adherend in the surface (α) was calculated in the same manner as that for the areal ratio ($S_1$) before heating.

<Area Increase Rate: {[($S_2$−$S_1$)/$S_1$]×100}>

From the areal ratio $S_1$ before heating of the attached area and the areal ratio $S_2$ after heating of the attached area determined in the above, the area increase rate {[($S_2$−$S_1$)/$S_1$]×100} was calculated. The results are shown in Table 3 and Table 4.

<Ratio of Volume-Average Secondary Particle Diameter of Fine Particles to Thickness of Resin Layer>

The value of the volume-average secondary particle diameter of the fine particles for calculating the above ratio was determined through measurement of particle size distribution using Multisizer III Coulter Counter (manufactured by Beckman Coulter Co., Ltd.), according to a Coulter counter method.

The value of the thickness of the resin layer for calculating the ratio was measured according to JIS K7130:1999, using a constant-pressure thickness gauge (trade name "PG-02" manufactured by TECLOCK Corporation).

From the resultant values, the ratio was calculated according to [volume-average secondary particle diameter of fine particles]/[thickness of resin layer]×100(%).

<Evaluation for Presence or Absence of Exposed Fine Particles to Constitute Particle Part (Y) of the Surface (α)>

Using a scanning electron microscope (trade name "S-4700" manufactured by Hitachi Limited), the surface of the sample was observed, and using an energy dispersion X-ray analyzer (trade name "INCA Energy", Type: E2H, manufactured by Oxford Instruments Corporation), a region surrounded by a square arbitrarily selected square having an edge length of 1 mm on the surface (α) of the resin layer was irradiated with X-ray to detect the atoms existing therein, thereby confirming the ratio of the atoms derived from fine particles (for example, silicon atoms in silica fine particles) on the surface (α) to the carbon atoms (fine particles-derived atoms/carbon atoms).

A: The ratio of silicon atoms/carbon atoms was 0.01 or less, and it was judged that no fine particles were exposed out on the surface (α).

F: The ratio of silicon atoms/carbon atoms was more than 0.01, and it was judged that fine particles were exposed out on the surface (α).

(Photographing Circumstances)
Magnification: 80
Object movable aperture: 2
Condenser lens 1: used, 2
Condenser lens 2: not used
Accelerating voltage: 10 kV
Emission current: 10.5 μA
Working distance: 12.2 mm (Energy Dispersion X-Ray Analyzer Conditions)
Process time: 5
Line scanning dual time: 2000 μs
Preset: endless
Measurement time: 180 sec Mass Retention Rate of Resin Layer of Pressure Sensitive Adhesive Sheet For Examples and Comparative Examples except for Example 17, the resin layer was formed according to the method of the Examples and Comparative Examples on the surface of the release agent layer of a release film ("SP-PET381031", a product name, produced by Lintec Corporation, a PET film having a silicone release agent layer provided on one surface thereof, thickness: 38 μm) instead of the substrate, and then the release film was removed, so as to provide a sole resin layer.

For Example 17, the two release films were removed from the pressure sensitive adhesive sheet without a substrate obtained in the course of the production, so as to provide a sole resin layer.

The resin layer before heating was measured for the mass thereof, and then heated to 800° C. for 30 minutes in a muffle furnace ("KDF-P90", a product name, produced by Denken Co., Ltd.). The resin layer after heating was measured for the mass thereof, and the mass retention rate of the resin layer was calculated by the following expression.

mass retention rate of resin layer (%)=((mass of resin layer after heating)/(mass of resin layer before heating))×100

The pressure sensitive adhesive sheets produced in Examples and Comparative Examples were measured or evaluated for the "air escape property", the "blister resistance", and the "adhesive strength" according to the following methods. The results are shown in Tables 3 and 4.

Air Escape Property

The pressure sensitive adhesive sheet with a substrate in a size of 50 mm in length and 50 mm in width was attached to a melamine-coated plate as an adherend in a manner forming air accumulation. The presence of absence of the air accumulation after press-attaching with a squeegee was observed, and the air escape property of the pressure sensitive adhesive sheets was evaluated based on the following standard.

A: The air accumulation disappeared, and excellent air escape property was obtained.

F: The air accumulation remained, and poor air escape property was obtained.

Blister Resistance

The pressure sensitive adhesive sheet with a substrate in a size of 50 mm in length and 50 mm in width was attached to a polymethyl methacrylate plate having a size of 70 mm in length, 150 mm in width, and 2 mm in thickness ("Acrylite L001", produced by Mitsubishi Rayon Co., Ltd.), followed by press-attaching with a squeegee, so as to provide a test specimen.

The test specimen was allowed to stand at 23° C. for 12 hours, then allowed to stand in a hot air dryer at 80° C. for 1.5 hours, further allowed to stand in a hot air dryer at 90° C. for 1.5 hours, and then visible to the naked eyes for the occurrence state of blister after the heat acceleration, and the blister resistance of the pressure sensitive adhesive sheets was evaluated based on the following standard.

A: Completely no blister was observed.
B: Blister was partially observed.
C: Blister was observed over the surface.

Adhesive Strength

The pressure sensitive adhesive sheets with a substrate produced in Examples and Comparative Examples were cut into a size of 25 mm in length and 300 mm in width, and the surface ($\alpha$) of the resin layer of the pressure sensitive adhesive sheets was attached to a stainless steel plate ($SUS_{304}$, polished with #360 polishing paper) under an environment of 23° C., 50% RH (relative humidity), followed by allowing to stand in the same environment for 24 hours. After standing, the adhesive strength of the pressure sensitive adhesive sheets was measured according to JIS Z0237:2000 by the 180° peeling method at a peeling speed of 300 mm/min.

TABLE 3

| | Thickness of coating film (μm) | | | Coating film (xβ') + y' + xα') Kind of solution | Coating film (y') | | Coating film (xα') Kind of solution | Resin layer | | | |
|---|---|---|---|---|---|---|---|---|---|---|---|
| | Coating film (xβ') | Coating film (xβ' + y') | Coating film (xβ' + y' + xα') | | Kind of coating liquid | Fine particle concentration in coating film (y') (mass %) | | Thickness (μm) | Shapes of one or more concave portions on surface (α) | | Maximum height difference (μm) |
| | | | | | | | | | Requirement (I) | Requirement (II) | |
| Example 1 | 25 | 75 | 100 | (x-1) | (y-1) | 40 | (x-1) | 25.7 | A | A+ | 15.7 |
| Example 2 | 12.5 | 75 | 100 | (x-1) | (y-1) | 40 | (x-1) | 25.1 | A | A+ | 17.3 |
| Example 3 | 25 | 50 | 100 | (x-1) | (y-1) | 40 | (x-1) | 23.9 | A | A+ | 7.6 |
| Example 4 | 25 | 200 | 250 | (x-1) | (y-1) | 40 | (x-1) | 43.1 | A | A+ | 42.4 |
| Example 5 | 25 | 75 | 100 | (x-1) | (y-2) | 35 | (x-1) | 23.8 | A | A+ | 6.6 |
| Example 6 | 25 | 75 | 100 | (x-1) | (y-3) | 45 | (x-1) | 30.1 | A | A+ | 26.3 |
| Example 7 | 25 | 75 | 100 | (x-1) | (y-1) | 50 | (x-1) | 32.3 | A | A+ | 30.8 |
| Example 8 | 25 | 200 | 250 | (x-1) | (y-2) | 35 | (x-1) | 41.0 | A | A+ | 3.5 |
| Example 9 | 25 | 80 (*1) | 145 (*1) | (x-2) | (y-1) | 40 | (x-1) | 42.0 | A | A+ | 18.5 |
| Comparative Example 1 | 25 (*2) | — | — | (x-1) | — | 0 | — | 25.0 | F | — (*3) | 0 |
| Comparative Example 2 | 5 (*2) | 20 (*2) | 25 (*2) | (x-1) | (y-1) | 40 | (x-1) | 25.0 | F | — (*3) | 0 |

| | Resin layer | | | | | | Pressure sensitive adhesive sheet evaluation Items | | |
|---|---|---|---|---|---|---|---|---|---|
| | Areal ratio S1 before heating (%) | Areal ratio S2 after heating (%) | Area increase rate {[(S2 − S1)/S1] × 100} (%) | Ratio of volume-average secondary particle diameter of fine particles to thickness of resin layer (%) | Presence or absence of exposed fine particles | Mass retention rate of resin layer (mass %) | Air escape property | Blister resistance | Adhesive strength (N/25 mm) |
| Example 1 | 59.9 | 60.5 | 1.06 | 11.5 | A | 16.9 | A | A | 8.6 |
| Example 2 | 54.3 | 56.1 | 3.33 | 12.0 | A | 20.0 | A | A | 12.7 |
| Example 3 | 61.6 | 65.3 | 6.06 | 12.5 | A | 9.5 | A | A | 11.7 |
| Example 4 | 41.8 | 44.8 | 7.21 | 6.8 | A | 28.1 | A | A | 7.8 |
| Example 5 | 71.7 | 70.4 | −1.88 | 12.5 | A | 15.0 | A | A | 9.4 |
| Example 6 | 55.2 | 56.6 | 2.55 | 10.0 | A | 20.9 | A | A | 10.1 |
| Example 7 | 54.3 | 55.1 | 1.33 | 9.1 | A | 23.1 | A | A | 10.8 |
| Example 8 | 89.8 | 92.2 | 2.70 | 7.3 | A | 21.3 | A | A | 12.4 |
| Example 9 | 47.7 | 50.5 | 5.89 | 7.1 | A | 15.1 | A | A | 10.2 |
| Comparative Example 1 | 100.0 | 100.0 | 0 | — | — | 0.0 | F | C | 18.0 |
| Comparative Example 2 | 100.0 | 100.0 | 0 | 12.0 | A | 17.0 | F | A | 15.0 |

(*1) This is not a measured value but the thickness of the coating film preset in the multilayer die coater.
(*2) This is the thickness of the coating film after dried.
(*3) No recess was formed on the surface (α), and the sample was not evaluated.

TABLE 4

| | Coating speed (m/min) | Flow rate of solution (coating liquid) (g/min) | | | Coating film (xβ') Kind of solution | Coating film Kind of coating liquid | Fine particle concentration in coating film (y') (mass %) | Coating film (xα') Kind of solution | Resin layer Thickness (μm) | Shapes of one or more concave portions on surface (α) | | |
|---|---|---|---|---|---|---|---|---|---|---|---|---|
| | | Coating film (xβ') | Coating film (y') | Coating film (xα') | | | | | | Requirement (I) | Requirement (II) | Maximum height difference (μm) |
| Example 10 | 3.0 | 27 | 27 | 27 | (x-1) | (y-1) | 40 | (x-1) | 30.0 | A | A+ | 20.3 |
| Example 11 | 3.0 | 27 | 21 | 27 | (x-1) | (y-1) | 40 | (x-1) | 26.7 | A | A+ | 15.0 |
| Example 12 | 3.0 | 27 | 9 | 27 | (x-1) | (y-1) | 40 | (x-1) | 23.3 | A | A+ | 10.6 |
| Example 13 | 3.0 | 27 | 51 | 54 | (x-3) | (y-5) | 41 | (x-3) | 51.0 | A | A+ | 42.5 |
| Example 14 | 3.0 | 27 | 27 | 27 | (x-4) | (y-6) | 40 | (x-4) | 29.6 | A | A+ | 19.5 |
| Example 15 | 3.0 | 27 | 27 | 27 | (x-4) | (y-7) | 40 | (x-4) | 29.2 | A | A+ | 19.2 |
| Example 16 | 3.0 | 27 | 27 | 27 | (x-5) | (y-8) | 40 | (x-6) | 29.5 | A | A+ | 17.7 |
| Example 17 | 3.0 | 27 | 51 | 54 | (x-3) | (y-5) | 41 | (x-3) | 51.0 | A | A+ | 41.0 |
| Example 18 | 5.0 | (8 μm) (*4) | 133 | 161 | (x-1) | (y-1) | 40 | (x-1) | 42.0 | A | A+ | 18.5 |

| | Resin layer | | | | | | Pressure sensitive adhesive sheet evaluation Items | | |
|---|---|---|---|---|---|---|---|---|---|
| | Areal ratio S1 before heating (%) | Areal ratio S2 after heating (%) | Area Increase rate {[(S2 − S1)/S1] × 100} (%) | Ratio of volume-average secondary particle diameter of fine particles to thickness of resin Layer (%) | Presence or absence of exposed fine particles | Mass retention rate of resin layer (mass %) | Air escape property | Blister resistance | Adhesive strength (N/25 mm) |
| Example 10 | 36.9 | 37.8 | 2.56 | 10.0 | A | 8.6 | A | A | 8.8 |
| Example 11 | 40.2 | 39.4 | −1.97 | 11.1 | A | 7.1 | A | A | 10.8 |
| Example 12 | 67.7 | 69.9 | 3.21 | 12.5 | A | 5.8 | A | A | 13.3 |
| Example 13 | 59.2 | 61.8 | 4.32 | 5.9 | A | 12.6 | A | A | 23.5 |
| Example 14 | 45.2 | 45.8 | 1.38 | 10.0 | A | 8.4 | A | A | 10.3 |
| Example 15 | 48.0 | 46.7 | −2.67 | 10.0 | A | 8.2 | A | A | 11.6 |
| Example 16 | 40.2 | 40.3 | 0.25 | 10.0 | A | 8.0 | A | A | 9.8 |
| Example 17 | 60.0 | 57.7 | −3.81 | 5.9 | A | 12.6 | A | A | 24.0 |
| Example 18 | 47.7 | 48.8 | 2.30 | 7.1 | A | 15.1 | A | A | 10.2 |

(*4) This is the thickness of the coating film (xβ') after dried.

As in Table 3 and Table 4, Examples 1 to 18 satisfying the above-mentioned requirements (1) and (2) had good air escape property, blister resistance and adhesive strength.

In all the pressure sensitive adhesive sheets produced in Examples 1 to 18, the irregular shape concave portions existing on the surface (α) were visible by the naked eye, and in observation with an electron microscope and visual observation of the region (P) for the requirements (I) and (II), plural concave portions having irregular shapes were confirmed and irregular presence of plural concave portions was also confirmed. In addition, it was also confirmed that the shapes of the one or more attached faces had irregular shapes.

For measurement of the areal ratio of the attached area to the surface (α) in the pressure sensitive adhesive sheets produced in Examples 1 to 18, the surface (α) 12a was adhered to the smooth surface 100a of the light transmissive adherend 100, as in FIG. 4(a), and the surface (α) was visually observed from the direction W on the side of the light transmissive adherend 100. As a result, in all the pressure sensitive adhesive sheet produced in Examples 1 to 18, presence of concave portions on the surface (α) was confirmed and the irregular shape of the attached area was also confirmed.

In addition, in all the pressure sensitive adhesive sheet produced in Examples 1 to 18, it was confirmed that one or more concave portions existing in the region (Q) on the surface (α) of the resin layer extended toward any side of a square having an edge length of 1 mm, which is a boundary line of the region (Q), and had a shape continuously extending in the other region (Q') surrounded by a square having an edge length of 1 mm, which is adjacent to the region (Q). This is also confirmed from the perspective view of the surface (α) of the resin layer in FIG. 5(b) and FIG. 6(b).

Here, FIG. 5 and FIG. 6 are images of the pressure sensitive adhesive sheet produced in Examples 1 and 10, respectively, each observed with a scanning electron microscope; and (a) is an image of a cross section of the pressure sensitive adhesive sheet, and (b) is a perspective image of the resin layer of the pressure sensitive adhesive sheet as taken from the surface (α) of the resin layer.

Figure 10:
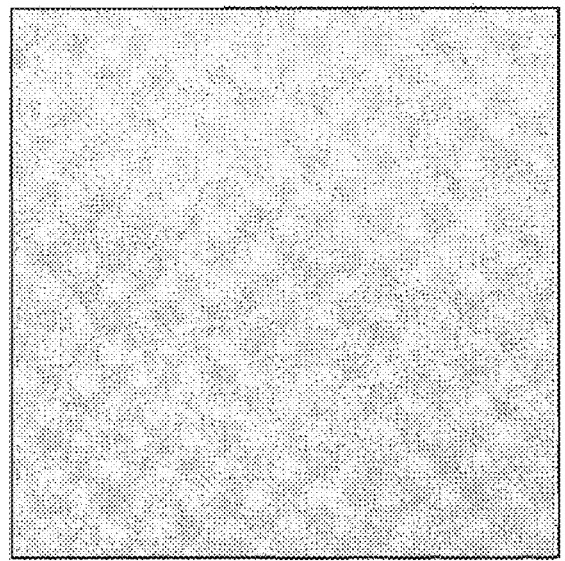
FIG. 10 is a binary image obtained in such a manner that the surface (α) of the resin layer of the pressure sensitive adhesive sheet produced in Comparative Example 1 is attached to a smooth surface of a light transmissive adherend, a digital image is obtained by observing the surface (α) from the side of the light transmissive adherend, and a region surrounded by a square having an edge length of 2 mm that is arbitrarily selected on the digital image is subjected to an image processing (binary processing).

In the image of FIG. 5(a), 10 scale marks given at the bottom right of the image indicate a length of 20.0 μm, and in the image of FIG. 5(b), 10 scale marks given at the bottom right of the image indicate a length of 1.00 mm. In the image of FIG. 6(a), 10 scale marks given at the bottom right of the image indicate a length of 200 μm, and in the image of FIG. 6(b), 10 scale marks given at the bottom right of the image indicate a length of 1.00 mm.

From the images of FIG. 5 and FIG. 6, it is known that plural concave portions exist irregularly on the surface (α) of the resin layer of the pressure sensitive adhesive sheets produced in Examples 1 and 10.

The cross-sectional profiles and the states of the one or more concave portions observed from the side of the surface (α) of the resin layer of the pressure sensitive adhesive sheets of the other Examples were the same as in the images shown in FIG. 5 and FIG. 6. Namely, also in the pressure sensitive adhesive sheet of the other Examples, irregular presence of plural concave portions in the region (P) arbitrarily selected on the surface (α) of the resin layer was confirmed.

The images of FIG. 5 and FIG. 6 show shapes of one or more concave portions existing on the surface (α) of the resin layer of the pressure sensitive adhesive sheets produced in Examples 1 and 10, respectively. The cross-sectional profiles and the states of the one or more concave portions observed from the side of the surface (α) of the resin layer of the pressure sensitive adhesive sheets of the other Examples were the same as in the images shown in FIG. 5 and FIG. 6.

On the other hand, formation of any specific concave portions could not be recognized on the surface of the resin layer that the pressure sensitive adhesive sheet produced in Comparative Examples 1 and 2 has, and the air escape property of these pressure sensitive adhesive sheets was poor. In addition, the pressure sensitive adhesive sheet of Comparative Example 1 was also poor in blister resistance.

FIG. 7 includes images of the pressure sensitive adhesive sheet produced in Comparative Example 1, taken through a scanning electron microscope; and (a) is an image of a cross section of the pressure sensitive adhesive sheet, and (b) is a perspective image as observed from the side of the surface (α) of the resin layer of the pressure sensitive adhesive sheet.

In the image of FIG. 7(a), 10 scale marks given at the bottom right of the image indicate a length of 20.0 µm, and in the image of FIG. 7(b), 10 scale marks given at the bottom right of the image indicate a length of 1.00 mm. As shown in FIG. 7, formation of concave portions was not seen on the surface (α) of the resin layer of the pressure sensitive adhesive sheet produced in Comparative Example 1.

Figure 8:
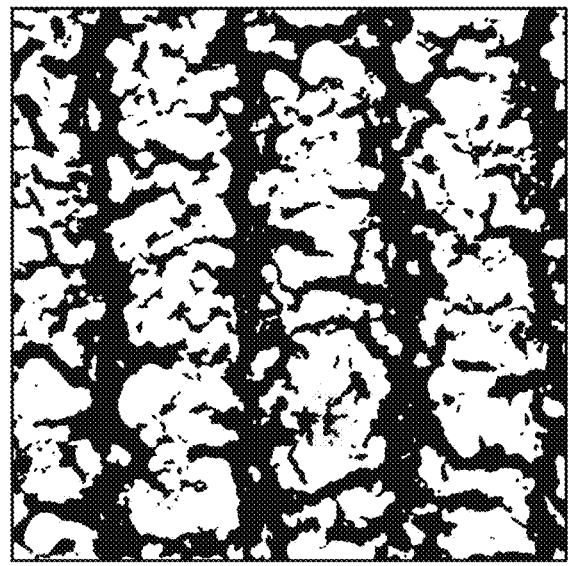
FIG. 8 is a binary image obtained in such a manner that the surface (α) of the resin layer of the pressure sensitive adhesive sheet produced in Example 1 is attached to a smooth surface of a light transmissive adherend, a digital image is obtained by observing the surface (α) from the side of the light transmissive adherend, and a region surrounded by a square having an edge length of 2 mm that is arbitrarily selected on the digital image is subjected to an image processing (binary processing).
Figure 9:
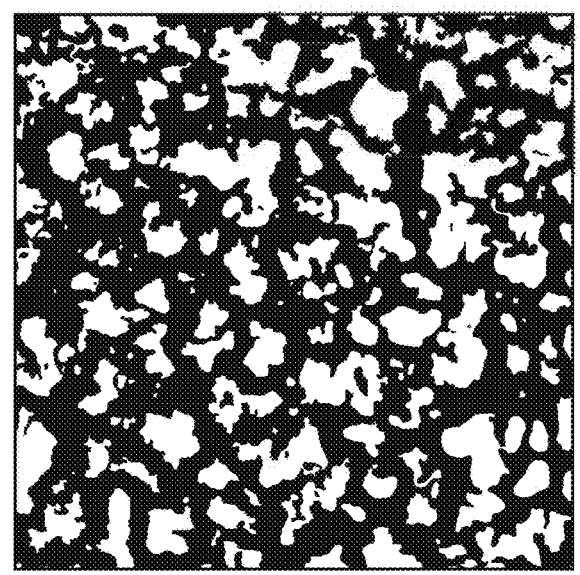
FIG. 9 is a binary image obtained in such a manner that the surface (α) of the resin layer of the pressure sensitive adhesive sheet produced in Example 10 is attached to a smooth surface of a light transmissive adherend, a digital image is obtained by observing the surface (α) from the side of the light transmissive adherend, and a region surrounded by a square having an edge length of 2 mm that is arbitrarily selected on the digital image is subjected to an image processing (binary processing).

FIGS. 8, 9 and 10 each are a binarized image obtained by image processing (image binarization), for which the surface (α) of the resin layer of the pressure sensitive adhesive sheet produced in any of Example 1, Example 10 and Comparative Example 1, respectively, is attached to a smooth surface of a light transmissive adherend having a smooth surface, the surface (α) is observed from the side of the light transmissive adherend to take a digital image thereof, and a region surrounded by an arbitrarily selected square having an edge length of 2 mm on the digital image is image-processed (image-binarized).

The operations to take the binarized image are the same as the operations (i) to (iii) for the item "areal ratio of the attached area".

In the images of FIGS. 8 to 10, the outer frame shows a square having an edge length of 2 mm. In the binarized images of FIG. 8 to FIG. 10, the white portions indicate the attached areas and the black portions indicate non-attached areas.

In the pressure sensitive adhesive sheet of Comparative Example 10, any concave portions were not formed on the surface (α) of the resin layer, and accordingly, the whole area of the surface (α) is an attached area, therefore presenting the binarized image of FIG. 10.

INDUSTRIAL APPLICABILITY

One embodiment of the pressure sensitive adhesive sheet of the present invention is useful as a pressure sensitive adhesive sheet having a large adhesive area that is used for identification or decoration, for masking in coating, and for surface protection for metal plates, etc.

REFERENCE SIGN LIST 1a, 1b, 2a, 2b Pressure Sensitive Adhesive Sheet
11 Substrate
12 Resin Layer
12a Surface (α)
12b Surface (β)
(X) Resin Part (X)
(Y) Particle Part (Y)
(Xβ) Layer (Xβ) mainly containing the resin part (X)
(Xα) Layer (Xα) mainly containing the resin part (X)
(Y1) Layer (Y1) containing the particle part (Y) in an amount of 15% by mass or more
13, 131, 132 Concave portions
14, 14a Release Material
50 Square having an edge length of 1 mm

The invention claimed is:

1. A pressure sensitive adhesive sheet, comprising:
a substrate or a release material; and
a resin layer on the substrate or the release material and comprising a resin part (X) comprising a resin as a main component and a particle part (Y) consisting of fine particles having a mean particle size of 0.01 to 100 µm,
wherein the fine particles comprise silica particles having a mass concentration of silica of 85 to 100% by mass,
wherein at least a surface (α) of the resin layer opposite to a side on which the substrate or the release material is provided has pressure sensitive adhesiveness,
wherein at least one concave portion exists on the surface (α),
when the surface (α) of the resin layer is adhered to a smooth surface of a light transmissive adherend having a smooth surface to give a laminate, the pressure sensitive adhesive sheet satisfies the following (1) and (2):
(1): in an environment at 23° C. and 50% RH, an areal ratio ($S_1$) of an attached area adhered to the smooth surface of the light transmissive adherend to the surface (α) before heating is 10 to 95%; and
(2): an area increase rate $\{[(S_2-S_1)/S_1]\times 100\}$ is −10 to 20%, where $S_2$ is an areal ratio of the attached area after heating the smooth surface of the light transmissive adherend by statically leaving the laminate at 80° C. for 30 minutes to the surface (α).

2. The pressure sensitive adhesive sheet according to claim 1, wherein an amount of the fine particles in the resin layer is 3 to 90% by mass.

3. The pressure sensitive adhesive sheet according to claim 1, wherein a volume-average secondary particle diameter of the fine particles constituting the particle part (Y) is 1 to 70% of the thickness of the resin layer.

4. The pressure sensitive adhesive sheet according to claim 1, wherein the fine particles constituting the particle part (Y) are not exposed out on the surface (α).

5. The pressure sensitive adhesive sheet according to claim 1, wherein the resin layer has a multi-layer structure comprising:
a layer (Xβ) mainly comprising the resin part (X);
a layer (Y1) comprising the particle part (Y) in an amount of 15% by mass or more; and
a layer (Xα) mainly comprising the resin part (X),
wherein the layer (Xβ), the layer (Y1), and the layer (Xα) are laminated in an order of the layer (Xβ), the layer (Y1), and the layer (Xα) from the side on which the substrate or the release material is provided.

6. The pressure sensitive adhesive sheet according to claim 5, wherein:
the layer (Xβ) is a layer formed by a composition (xβ) comprising the resin as a main component, the layer (Y1) is a layer formed by a composition (y) comprising the fine particles in an amount of 15% by mass or more, and the layer (Xα) is a layer formed by a composition (xα) comprising the resin as a main component.

7. A method for producing the pressure sensitive adhesive sheet according to claim 6, the method comprising:
   (i) forming, on the substrate or the release material, a coating film (xβ') formed by the composition (xβ) comprising the resin as a main component, a coating film (y') formed by the composition (y) comprising the fine particles in an amount of 15% by mass or more on the coating film (xβ'), and a coating film (xα') formed by the composition (xα) comprising the resin as a main component on the coating film (y'), by laminating; and
   (ii) drying the coating film (xβ'), the coating film (y') and the coating film (xα') simultaneously.

8. A method for producing the pressure sensitive adhesive sheet according to claim 6, the method comprising:
   (i) forming, on the layer (Xβ) mainly comprising a resin part (X) that is provided on a substrate or a release material, a coating film (y') formed by the composition (y) comprising the fine particles in an amount of 15% by mass or more and forming, on the coating film (y'), a coating film (xα') formed by the composition (xα) comprising the resin as a main component, by laminating; and
   (ii) drying the coating film (y') and the coating film (xα') simultaneously.

9. A method for producing the pressure sensitive adhesive sheet according to claim 1, the method comprising:
   (i) forming a coating film (x') formed by a composition (x) comprising the resin as a main component, and a coating film (y') formed by a composition (y) comprising the fine particles in an amount of 15% by mass or more; and
   (ii) drying the coating film (x') and the coating film (y') simultaneously.

10. The pressure sensitive adhesive sheet according to claim 1, wherein the fine particles are the silica particles.

* * * * *

UNITED STATES PATENT AND TRADEMARK OFFICE
CERTIFICATE OF CORRECTION

PATENT NO. : 10,221,339 B2  
APPLICATION NO. : 15/300141  
DATED : March 5, 2019  
INVENTOR(S) : Satoshi Kawada et al.

Page 1 of 1

It is certified that error appears in the above-identified patent and that said Letters Patent is hereby corrected as shown below:

On the Title Page

Item (30), the Foreign Application Priority Data is incorrect. Item (30) should read:
-- (30) Foreign Application Priority Data
Apr. 2, 2014 (JP) ………….. 2014-076577
Apr. 2, 2014 (JP) ………….. 2014-076579
Apr. 2, 2014 (JP) ………….. 2014-076580 --

Signed and Sealed this  
Twenty-eighth Day of April, 2020

Andrei Iancu  
*Director of the United States Patent and Trademark Office*